(12) United States Patent
Abdelghaffar et al.

(10) Patent No.: US 11,777,580 B2
(45) Date of Patent: Oct. 3, 2023

(54) CHANNEL STATE INFORMATION MEASUREMENT ADAPTATION TO MAXIMUM MULTIPLE-INPUT MULTIPLE-OUTPUT LAYERS

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Huilin Xu, Temecula, CA (US); Wooseok Nam, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/147,259

(22) Filed: Dec. 28, 2022

(65) Prior Publication Data

US 2023/0163826 A1    May 25, 2023

Related U.S. Application Data

(63) Continuation of application No. 17/002,639, filed on Aug. 25, 2020, now Pat. No. 11,558,095.
(Continued)

(51) Int. Cl.
*H04B 7/06* (2006.01)
*H04B 7/0413* (2017.01)
*H04L 5/00* (2006.01)

(52) U.S. Cl.
CPC ......... *H04B 7/0626* (2013.01); *H04B 7/0413* (2013.01); *H04L 5/001* (2013.01); *H04L 5/0023* (2013.01); *H04L 5/0057* (2013.01)

(58) Field of Classification Search
CPC .. H04B 7/0626; H04B 7/0413; H04B 7/0486; H04L 5/001; H04L 5/0023; H04L 5/0057;
(Continued)

(56) References Cited

U.S. PATENT DOCUMENTS

| 10,305,568 B1 | 5/2019 | Mittal et al. |
| 2016/0006553 A1* | 1/2016 | Kim ............. H04L 1/1864 370/252 |

(Continued)

FOREIGN PATENT DOCUMENTS

| CN | 103312439 A | 9/2013 |
| WO | 2017128800 | 8/2017 |

OTHER PUBLICATIONS

European Search Report—EP22206869—Search Authority—MUNICH—dated Feb. 14, 2023.
(Continued)

*Primary Examiner* — Fitwi Y Hailegiorgis
(74) *Attorney, Agent, or Firm* — Patterson + Sheridan, L.L.P.

(57) ABSTRACT

Certain aspects of the present disclosure provide techniques for channel state information measurement adaptation to maximum multiple-input multiple-output layers. A method that may be performed by a user equipment (UE) includes receiving a first channel state information (CSI) report configuration including one or more first CSI reference signal (CSI-RS) resources, wherein each first CSI-RS resource comprises a first resource set; determining, based on an indication of a maximum number of multiple-input multiple-output (MIMO) layers that the UE is expected to receive, a first resource subset on which to report first CSI; and reporting the first CSI to a base station (BS), wherein the first CSI is based on the determined first resource subset.

30 Claims, 12 Drawing Sheets

Related U.S. Application Data

(60) Provisional application No. 62/891,665, filed on Aug. 26, 2019.

(58) Field of Classification Search
CPC ... H04L 5/0094; H04L 5/0048; H04L 5/0091; Y02D 30/70; H04W 52/0229; H04W 52/0274
USPC .......................................................... 375/267
See application file for complete search history.

(56) References Cited

U.S. PATENT DOCUMENTS

| | | | |
|---|---|---|---|
| 2017/0237478 A1* | 8/2017 | Kwak | H04B 7/0639 370/329 |
| 2018/0219664 A1 | 8/2018 | Guo et al. | |
| 2019/0260448 A1 | 8/2019 | Rahman et al. | |
| 2021/0067220 A1 | 3/2021 | Abdelghaffar et al. | |

OTHER PUBLICATIONS

3GPP TS 38.214, "3rd Generation Partnership Project; Technical Specification Group Radio Access Network; NR; Physical Layer Procedures for Data (Release 15)", 3GPP Standard, Technical Specification, 3GPP TS 38.214, 3rd Generation Partnership Project, Mobile Competence Centre, 650, Route Des Lucioles, F-06921, Sophia-Antipolis Cedex, France, vol. RAN WG1, No. V15.6.0, Jun. 24, 2019, XP051754328, pp. 1-105, Section 5.2, chapter 5.1.5, Section 5.1.2.2, p. 15-p. 16.

Ericsson: "On CSI Enhancements for MU-MIMO", 3GPP Draft, 3GPP TSG RAN WG1 Meeting RAN1#97, R1-1907074, On CSI Enhancements for MU-MIMO, 3rd Generation Partnership Project (3GPP), Mobile Competence Centre, 650 Route Des Lucioles, F-06921 Sophia-Antipolis Cedex, France, vol. RAN WG1, No. Reno, US, May 13, 2019-May 17, 2019, May 13, 2019 (May 13, 2019), XP051728520, 19 Pages, section 1-3.

International Search Report and Written Opinion—PCT/US2020/047988—ISA/EPO—dated Feb. 22, 2021.

Partial International Search Report—PCT/US2020/047988—ISA/EPO—dated Nov. 17, 2020.

Qualcomm Incorporated: "Adaptation of Maximum Number of MIMO Layers", 3GPP Draft, 3GPP TSG-RAN WG1 #99, R1-1912972, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823734, 3 pages, the whole document.

Samsung: "Draft CR on CPU Occupancy for Semi-Persistent CSI Report", 3GPP Draft, 3GPP TSG RAN WG1 Meeting #98, R1-1908453, Draft CR on CPU Occupation, 3rd Generation Partnership Project (3GPP), Mobile Competence Centre, 650, Route Des Lucioles, F-06921, Sophia-Antipolis, Cedex, France, vol. RAN WG1, No. Prague, CZ, Aug. 26, 2019-Aug. 30, 2019, Aug. 16, 2019 (Aug. 16, 2019), XP051765062, 3 pages, the whole document.

Samsung: "UE Adaptation to Maximum Number of MIMO Layers", 3GPP Draft, 3GPP TSG RAN WG1 #98, R1-1908507, UE Adaptation to Maximum Number of Mimo Layers, 3rd Generation Partnership Project (3GPP), Mobile Competence Centre, 650, Route Des Lucioles, F-06921 Sophia-Antipolis Cedex, vol. RAN WG1, No. Prague, CZ, Aug. 26, 2019-Aug. 30, 2019, Aug. 16, 2019 (Aug. 16, 2019), XP051765115, 7 pages, the whole document.

\* cited by examiner

CHANNEL STATE INFORMATION MEASUREMENT ADAPTATION TO MAXIMUM MULTIPLE-INPUT MULTIPLE-OUTPUT LAYERS

CROSS-REFERENCE TO RELATED APPLICATIONS

This application is a continuation of U.S. patent application Ser. No. 17/002,639, filed Aug. 25, 2020, which claims benefit of U.S. Provisional Patent Application No. 62/891,665, filed on Aug. 26, 2019, which are both assigned to the assignee hereof and herein incorporated by reference in their entireties as if fully set forth below and for all applicable purposes.

FIELD OF THE DISCLOSURE

Aspects of the present disclosure relate to wireless communications, and more particularly, to techniques for reducing channel state information (CSI) measurements and calculations by user equipments (UEs) assigned to receive reduced numbers of multiple-input multiple-output (MIMO) layers.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include reductions in power consumption due to reductions in channel state information (CSI) measurements, calculations, and reporting when a UE is assigned to receive a reduced maximum number of multiple-input multiple-output (MIMO) layers.

Certain aspects provide a method for wireless communication performed by a user equipment (UE). The method generally includes receiving a first channel state information (CSI) report configuration including one or more first CSI reference signal (CSI-RS) resources, wherein each first CSI-RS resource comprises a first resource set; determining, based on an indication of a maximum number of multiple-input multiple-output (MIMO) layers that the UE is expected to receive, a first resource subset on which to report first CSI; and reporting the first CSI to a base station (BS), wherein the first CSI is based on the determined first resource subset.

Certain aspects of the present disclosure are directed to an apparatus for wireless communication. The apparatus generally includes memory and at least one processor coupled to the memory, the memory and the at least one processor configurable or configured to: receive a first CSI report configuration including one or more first CSI-RS resources, wherein each first CSI-RS resource comprises a first resource set; determine, based on an indication of a maximum number of MIMO layers that the apparatus is expected to receive, a first resource subset on which to report first CSI; and report the first CSI to a base station (BS), wherein the first CSI is based on the determined first resource subset.

Certain aspects of the present disclosure are directed to an apparatus for wireless communication. The apparatus generally includes means for receiving a first CSI report configuration including one or more first CSI-RS resources, wherein each first CSI-RS resource comprises a first resource set; means for determining, based on an indication of a maximum number of MIMO layers that the apparatus is expected to receive, a first resource subset on which to report first CSI; and means for reporting the first CSI to a BS, wherein the first CSI is based on the determined first resource subset.

Certain aspects of the present disclosure are directed to a computer readable medium having instructions stored thereon that, when executed by a processing system, cause the processing system to perform operations including: receiving a first CSI report configuration including one or more first CSI-RS resources, wherein each first CSI-RS resource comprises a first resource set; determining, based on an indication of a maximum number of MIMO layers that an apparatus including the processing system is expected to receive, a first resource subset on which to report first CSI; and reporting the first CSI to a BS, wherein the first CSI is based on the determined first resource subset.

Certain aspects provide a method for wireless communication performed by a base station (BS). The method generally includes transmitting, to a user equipment (UE), a first channel state information (CSI) report configuration including one or more first CSI reference signal (CSI-RS) resources, wherein each first CSI-RS resource comprises a first resource set; receiving the first CSI from the UE, wherein the first CSI is based on a first resource subset; and determining, based on an indication of a maximum number of multiple-input multiple-output (MIMO) layers that the UE is expected to receive, the first resource subset on which the first CSI is based.

Certain aspects of the present disclosure are directed to an apparatus for wireless communication. The apparatus generally includes memory and at least one processor coupled to the memory, the memory and the at least one processor configurable or configured to: transmit, to a UE, a first CSI report configuration including one or more first CSI-RS resources, wherein each first CSI-RS resource comprises a first resource set; receive the first CSI from the UE, wherein the first CSI is based on a first resource subset; and determine, based on an indication of a maximum number of MIMO layers that the UE is expected to receive, the first resource subset on which the first CSI is based.

Certain aspects of the present disclosure are directed to an apparatus for wireless communication. The apparatus generally includes means for transmitting, to a UE, a first CSI report configuration including one or more first CSI-RS resources, wherein each first CSI-RS resource comprises a first resource set; means for receiving the first CSI from the UE, wherein the first CSI is based on a first resource subset; and means for determining, based on an indication of a maximum number of MIMO layers that the UE is expected to receive, the first resource subset on which the first CSI is based.

Certain aspects of the present disclosure are directed to a computer readable medium having instructions stored thereon that, when executed by a processing system, cause the processing system to perform operations including: transmitting, to a UE, a first CSI report configuration including one or more first CSI-RS resources, wherein each first CSI-RS resource comprises a first resource set; receiving the first CSI from the UE, wherein the first CSI is based on a first resource subset; and determining, based on an indication of a maximum number of MIMO layers that the UE is expected to receive, the first resource subset on which the first CSI is based.

Certain aspects provide a method for wireless communication performed by a user equipment (UE). The method generally includes changing, based on an indication of a maximum number of multiple-input multiple-output (MIMO) layers that the UE is expected to receive, from a first number of available channel state information (CSI) reference signal (CSI-RS) processing units (CPUs) of the UE to a second number of available CPUs of the UE; and sending, to a base station (BS), an indication that the UE has changed to the second number of available CPUs.

Certain aspects of the present disclosure are directed to an apparatus for wireless communication. The apparatus generally includes memory and at least one processor coupled to the memory, the memory and the at least one processor configurable or configured to: change, based on an indication of a maximum number of MIMO layers that the apparatus is expected to receive, from a first number of available CPUs of the apparatus to a second number of available CPUs of the apparatus; and send, to a BS, an indication that the apparatus has changed to the second number of available CPUs.

Certain aspects of the present disclosure are directed to an apparatus for wireless communication. The apparatus generally includes means for changing, based on an indication of a maximum number of MIMO layers that the apparatus is expected to receive, from a first number of available CPUs of the apparatus to a second number of available CPUs of the apparatus; and means for sending, to a BS, an indication that the apparatus has changed to the second number of available CPUs.

Certain aspects of the present disclosure are directed to a computer readable medium having instructions stored thereon that, when executed by a processing system, cause the processing system to perform operations including: changing, based on an indication of a maximum number of MIMO layers that an apparatus including the processing system is expected to receive, from a first number of available CPUs of the apparatus to a second number of available CPUs of the apparatus; and sending, to a BS, an indication that the apparatus has changed to the second number of available CPUs.

Certain aspects provide a method for wireless communication performed by a base station (BS). The method generally includes transmitting, to a user equipment (UE), an indication of a maximum number of multiple-input multiple-output (MIMO) layers that the UE is expected to receive; and receiving, from the UE, an indication that the UE has changed from a first number of available channel state information (CSI) reference signal (CSI-RS) processing units (CPUs) of the UE to a second number of available CPUs of the UE.

Certain aspects of the present disclosure are directed to an apparatus for wireless communication. The apparatus generally includes memory and at least one processor coupled to the memory, the memory and the at least one processor configurable or configured to: transmit, to a UE, an indication of a maximum number of MIMO layers that the UE is expected to receive; and receive, from the UE, an indication that the UE has changed from a first number of available CPUs of the UE to a second number of available CPUs of the UE.

Certain aspects of the present disclosure are directed to an apparatus for wireless communication. The apparatus generally includes means for transmitting, to a UE, an indication of a maximum number of MIMO layers that the UE is expected to receive; and means for receiving, from the UE, an indication that the UE has changed from a first number of available CPUs of the UE to a second number of available CPUs of the UE.

Certain aspects of the present disclosure are directed to a computer readable medium having instructions stored thereon that, when executing by a processing system, cause the processing system to perform operations including: transmitting, to a UE, an indication of a maximum number of MIMO layers that the UE is expected to receive; and receiving, from the UE, an indication that the UE has changed from a first number of available CPUs of the UE to a second number of available CPUs of the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
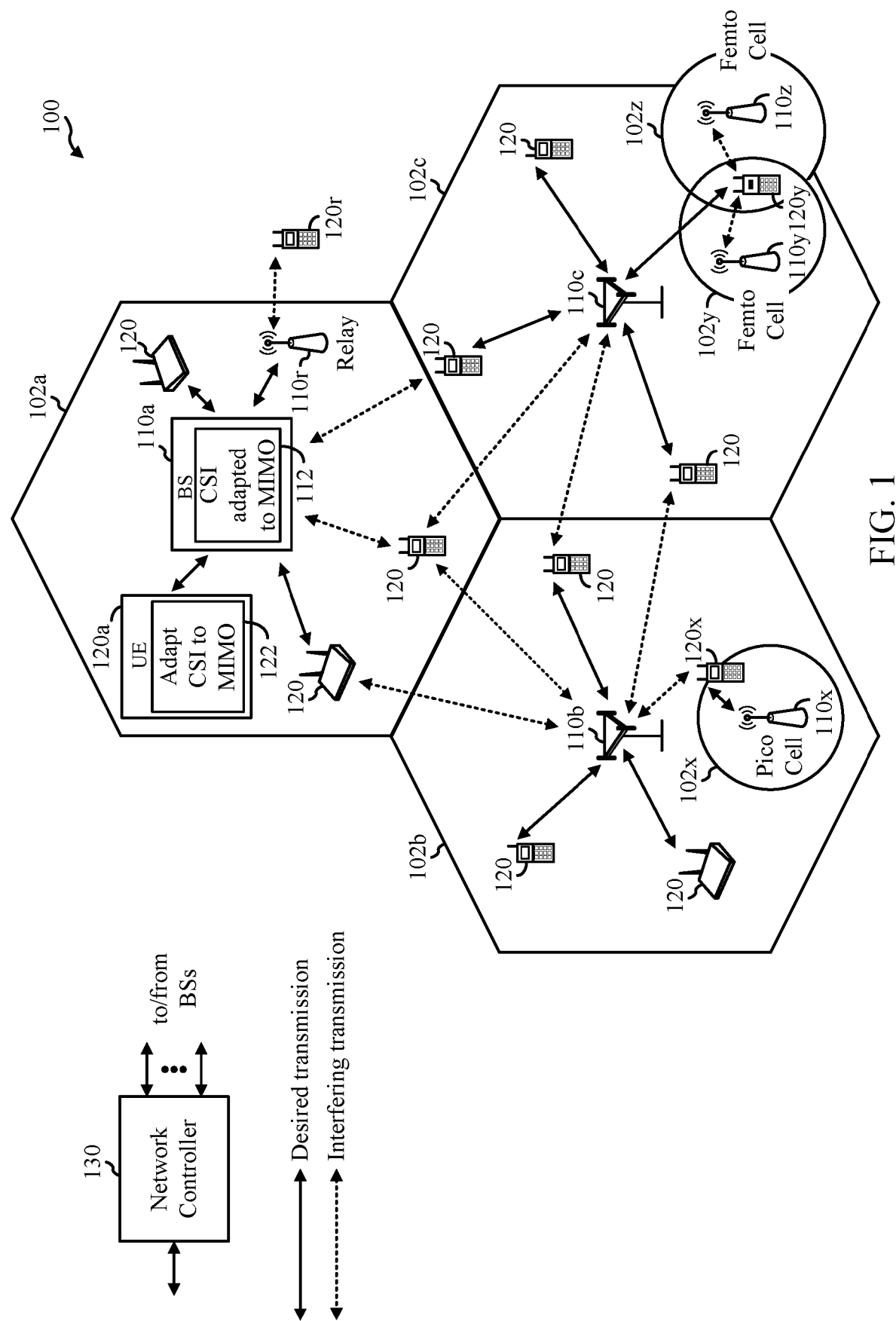
FIG. 1 is a block diagram conceptually illustrating an example telecommunications system, in accordance with certain aspects of the present disclosure.

Aspects of the present disclosure provide apparatus, methods, processing systems, and computer readable mediums for reducing channel state information (CSI) measurements and calculations by user equipments (UEs) assigned to receive reduced numbers of multiple-input multiple-output (MIMO) layers. UE power consumption is typically highly dependent on the number of MIMO layers that the UE receives. To process a higher number of MIMO layers, a typical UE consumes large quantities of power in the radio frequency (RF) subsystem and the baseband subsystem of the UE. In the RF subsystem, the UE activates a number of reception antennas or panels at least equal to the number of MIMO layer for reception of the MIMO signal. In the baseband side subsystem, use of the MIMO decoder requires significant power. Accordingly, indication to the UE of the maximum number of MIMO layers that the UE will be expected to receive can help save power by enabling the UE to adapt the number of reception antennas or panels and the baseband processing system of the UE.

The following description provides examples of channel state information (CSI) measurement adaptation to maximum MIMO layers in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a*-*z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for adapting CSI to MIMO layers. As shown in FIG. 1, the BS 110a includes a CSI adapted to MIMO manager 112. The CSI adapted to MIMO manager 112 may be configured to transmit, to a user equipment (UE), a first channel state information (CSI) report configuration including one or more first CSI reference signal (CSI-RS) resources, wherein each first CSI-RS resource comprises a first resource set; to receive the first CSI from the UE, wherein the first CSI is based on a first resource subset; and to determine, based on an indication of a maximum number of multiple-input multiple-output (MIMO) layers that the UE is expected to receive, the first resource subset on which the first CSI is based, in accordance with aspects of the present disclosure. As shown in FIG. 1, the UE 120a includes an adapt CSI to MIMO manager 122. The adapt CSI to MIMO manager 122 may be configured to receive a first channel state information (CSI) report configuration including one or more first CSI reference signal (CSI-RS) resources, wherein each first CSI-RS resource comprises a first resource set; to determine, based on an indication of a maximum number of multiple-input multiple-output (MIMO) layers that the UE is expected to receive, a first resource subset on which to report first CSI; and to report the first CSI to a base station (BS), wherein the first CSI is based on the determined first resource subset, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
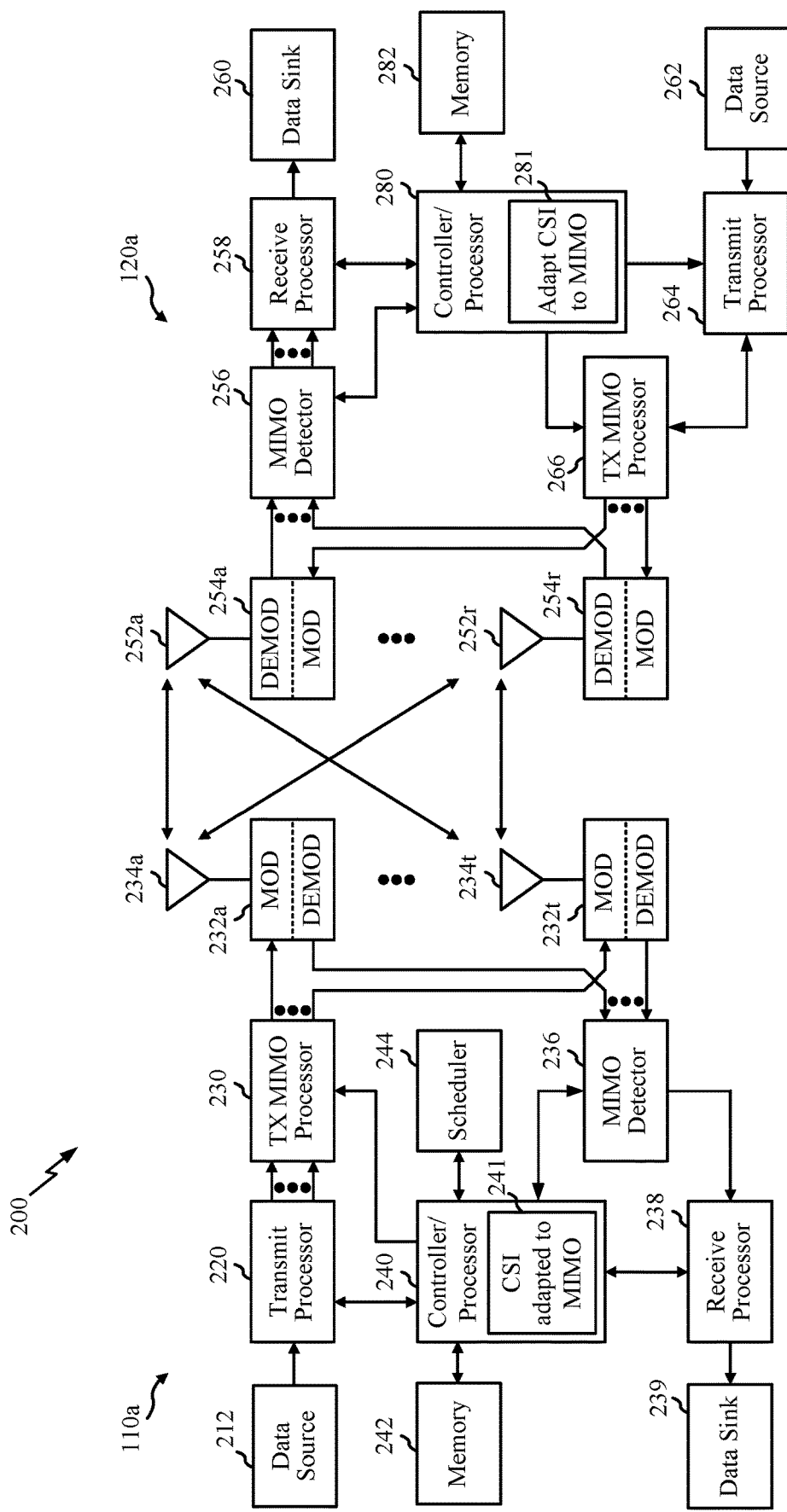
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

For example, the controller/processor 280 and/or other processors or modules at the UE 120a, or the controller/processor 240 and/or other processors or modules at the BS 11a, may perform or direct the execution of processes for the techniques described herein. For example, as shown in FIG. 2, the controller/processor 240 of the BS 110a has a CSI adapted to MIMO manager 241 that may be configured for transmitting, to a user equipment (UE), a first channel state information (CSI) report configuration including one or more first CSI reference signal (CSI-RS) resources, wherein each first CSI-RS resource comprises a first resource set; for receiving the first CSI from the UE, wherein the first CSI is based on a first resource subset; and for determining, based on an indication of a maximum number of multiple-input multiple-output (MIMO) layers that the UE is expected to receive, the first resource subset on which the first CSI is based, according to aspects described herein. As shown in FIG. 2, the controller/processor 280 of the UE 120a has an adapt CSI to MIMO manager 281 that may be configured for receiving a first channel state information (CSI) report configuration including one or more first CSI reference signal (CSI-RS) resources, wherein each first CSI-RS resource comprises a first resource set; for determining, based on an indication of a maximum number of multiple-input multiple-output (MIMO) layers that the UE is expected to receive, a first resource subset on which to report first CSI; and for reporting the first CSI to a base station (BS), wherein the first CSI is based on the determined first resource subset, according to aspects described herein. Although shown at the Controller/Processor, other components of the UE 120a and BS 110a may be used performing the operations described herein.

In aspects of the present disclosure, occasionally two or more CSI report transmissions by a UE "collide", in the sense that they are scheduled to be transmitted simultaneously, for instance a periodic CSI report and an aperiodic CSI report may be scheduled for transmission in a same period (e.g., a slot or subframe). In addition, it is possible for a number of CSI reports scheduled to be transmitted simultaneously to result in a payload size that is too large to fit in an uplink control information (UCI) container, for instance due to hybrid automatic retransmission request (HARQ) acknowledgments (HARQ-ACKs) and/or a scheduling request (SR) that the transmitting UE is attempting to multiplex with the CSI reports in the UCI. For these situations, some CSI reports may be dropped or omitted by the UE. In order to prioritize the CSI reports, a number of prioritization rules are defined in previously known techniques. CSI reports are first prioritized according to their time-domain behavior (e.g., how dynamic a CSI report is) and physical channel, where more dynamic reports (e.g., aperiodic reports) are given precedence over less dynamic reports (e.g., periodic reports) and reports via physical uplink shared channel (PUSCH) have precedence over reports via physical uplink control channel (PUCCH). For example, an aperiodic report has priority over a semi-persistent report on PUSCH, which in turn has priority over a semi-persistent report on PUCCH, which has priority over a periodic CSI report. If multiple CSI reports with the same time-domain behavior and physical channel collide, the reports are further prioritized depending on CSI content, where beam reports (e.g., layer one reference signal received power (L1-RSRP) reporting) have priority over regular CSI reports. The motivation for giving beam reports higher priority is that a non-beam CSI report is typically conditioned on a serving beam, so if the beam is not correct then the non-beam CSI report is useless. If there is still a need for differentiation, the CSI reports are further prioritized based on which serving cell the CSI corresponds to in case of carrier aggregation (CA) operation. That is, CSI corresponding to a primary cell (PCell) has priority over CSI corresponding to secondary cells (SCells). Finally, in order to avoid any ambiguities in which CSI report is to be transmitted, the CSI reports are prioritized based on a report configuration identifier (reportConfigID) for each CSI report.

The above described CSI priority rules are applied so that only a single CSI report is transmitted in case of a CSI report collision, with the exception of a situation wherein multiple PUCCH-based CSI reports collide. In this case, it is possible the UE may be configured with a larger "multi-CSI" PUCCH resource, wherein several CSI reports can be multiplexed. When using the multi-CSI PUCCH resource, as many CSI reports as can be multiplexed, without exceeding a maximum UCI code rate, are transmitted in the "multi-CSI" PUCCH resource.

According to previously known techniques, the above described rules for prioritizing CSI reports may be described in mathematical terms as follows. Each CSI reports is associated with a priority value:

$$Pri_{iCSI}(y,k,c,s) = 2 \cdot N_{cells} \cdot M_s \cdot y + N_{cells} \cdot M_s \cdot k + M_s \cdot c + s;$$

where y=0 for aperiodic CSI reports to be carried on PUSCH, y=1 for semi-persistent CSI reports to be carried on PUSCH, y=2 for semi-persistent CSI reports to be carried on PUCCH, and y=3 for periodic CSI reports to be carried on PUCCH;

k=0 for CSI reports carrying L1-RSRP and k=1 for CSI reports not carrying L1-RSRP;

c is the serving cell index and $N_{cells}$ is the value of the higher layer parameter maxNrofServingCells;

s is the reportConfigID and $M_s$ is the value of the higher layer parameter maxNrofCSI-ReportConfigurations.

A first CSI report is said to have priority over a second CSI report if the associated $Pri_{iCSI}(y,k,c,s)$ value for the first report is lower than the associated $Pri_{iCSI}(y,k,c,s)$ for the second report.

In previously known techniques (e.g., new radio (NR) or $5^{th}$ generation (5G)), the concept of a CSI processing unit (CPU) is described, wherein the number of CPUs of a UE is equal to the number of simultaneous CSI calculations supported by the UE. A CPU can be seen as a generic CSI calculation engine, which can process any kind of CSI report, and may be implemented via software, as an example.

When calculation of a CSI report is about to proceed, e.g., either when the UE gets triggered to provide an aperiodic CSI report or when computation starts for a periodic or semi-persistent CSI report, the CSI report being calculated is allocated to one or more available CPUs.

If there are not enough CPUs available (e.g., due to the UE already processing other CSI reports), the CSI report to be allocated may not be calculated by the UE. Instead, the UE can report stale CSI, such as a previously calculated CSI report stored in memory, or simply pad the CSI report with dummy bits. The CSI report is not dropped in this case, but instead some content is always transmitted in order to avoid changing rate matching procedures for the PUSCH or PUCCH transmission, as changing the rate matching procedures could be error-prone.

Each CSI report that is committed for calculation by the UE thus occupies a number $O^{(n)}CPU$ CPUs from a starting allocation time until the last symbol of the physical channel (e.g., PUCCH or PUSCH) carrying the CSI report has finished transmitting, at which point the number $O^{(n)}CPU$ CPUs are released (e.g., for calculating CSI for later reports). For an aperiodic CSI report, the starting allocation time of the CPU(s) is the last symbol of the physical downlink control channel (PDCCH) conveying the trigger for the aperiodic CSI report. For periodic and semi-persistent CSI reports, the CPU(s) are allocated from the time of the occurrence of the last channel state information reference signal (CSI-RS) or interference measurement (IM) resource used to calculate the report. That is, for periodic or semi-persistent reports, the UE can be assumed to start calculation of the CSI report as soon as the UE has received the last occurrence of the measurement resource.

For non-beam related CSI reports (e.g., when a reportQuantity of the CSI report is not equal to 'cri-RSRP', 'ssb-Index-RSRP' or 'none'), the CSI report occupies as many CPUs as the number of CSI-RS resources in the CSI-RS resource set for channel measurement. This is because a UE may, in the worst case, need to calculate a complete CSI report for each CSI-RS resource in parallel in order for the UE to determine which CSI-RS resource is optimal and shall be selected with the corresponding CSI-RS resource indicator (CRI).

Figure 3A:
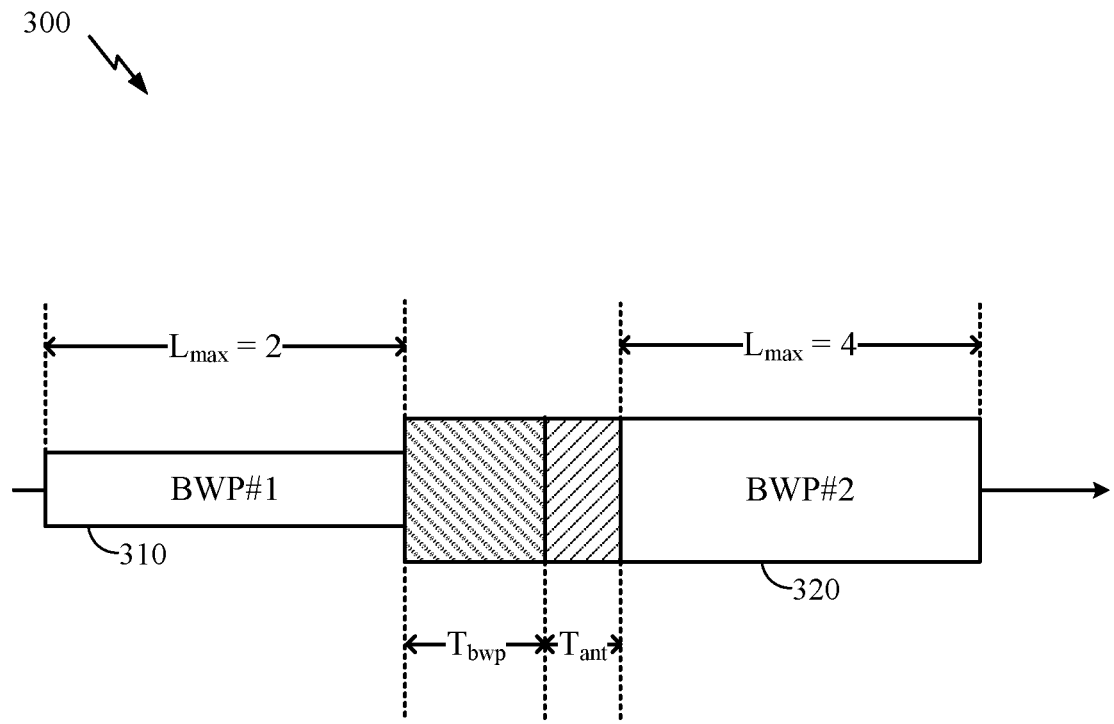
FIG. 3A is an exemplary transmission timeline, in accordance with aspects of the present disclosure.
Figure 3B:
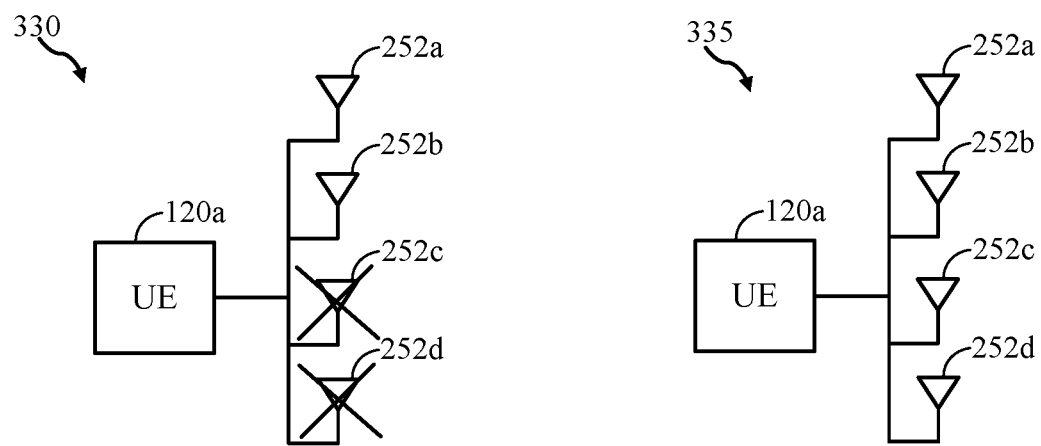
FIG. 3B illustrates example UE antenna (or panel) activation configurations, in accordance with aspects of the present disclosure.

FIG. 3A is an exemplary transmission timeline 300, in accordance with aspects of the present disclosure. As described above, UE power consumption is typically dependent on the number of MIMO layers that the UE receives. Thus, in the exemplary timeline 300, the UE 120a is assigned to (e.g., configured with) a first active BWP 310, where the UE is expected to receive a maximum of two MIMO layers, e.g., $L_{max}=2$. Thus, as illustrated in FIG. 3B at 330, the UE deactivates two antennas (or panels), 252c and 252d, of the four antennas (or panels), 252a, 252b, 252c, and 252d, of the UE. This may allow the UE to save significant power over having all four antennas (or panels) active. The UE may also deactivate portions of a MIMO decoder of the UE, based on the maximum number of MIMO layers the UE is expected to receive. Later, the UE is assigned to a second active BWP 320, where the UE is expected to receive a maximum of four MIMO layers, e.g., $L_{max}=4$. Thus, the UE activates the four antennas 252a, 252b, 252c, and 252d, as shown at 335. In certain aspects, the UE may receive BWP specific CSI-RS configurations, where each CSI-RS configuration corresponds to CSI-RS resources for which the UE is to report measurements. That is, the first active BWP 310 may include a first CSI-RS configuration, and the second active BWP 320 may include a second (e.g., different) CSI-RS configuration. Thus, when the UE is assigned to a different active BWP (e.g., switching from the first active BWP 310 to the second active BWP 320), the UE may use a new CSI-RS resource reporting configuration. In some cases, the BS may signal a new CSI-RS configuration for a BWP. That is, the UE may be assigned the first active BWP 310, and receive a new configuration for CSI-RS resources to report on instead of changing to a different BWP (e.g., the second active BWP 320) entirely.

While FIG. 3A depicts the first active BWP 310 and the second active BWP 320 as overlapping in frequency, the present disclosure is not so limited, and the first active BWP and the second active BWP do not necessarily overlap in frequency. Also, while four antennas (or panels) 252a, 252b, 252c, and 252d are depicted, the current disclosure is not so limited, and the techniques described herein may be applicable to devices with more than 4 antennas (or panels) (e.g., 6, 8, 10, etc. antennas). While deactivating the antennas saves power of the UE, even more power can be saved if the UE is able to reduce resources devoted to calculating CSI for MIMO layers that the UE is not expected to receive (e.g., MIMO layers above a maximum number of MIMO layers the UE is configured to receive).

Accordingly, what is needed are techniques and apparatus for reducing channel state information (CSI) measurements and calculations by user equipments (UEs) assigned to receive reduced numbers of multiple-input multiple-output (MIMO) layers.

Example Channel State Information Measurement Adaptation to Maximum Multiple-Input Multiple-Output Layers Aspects of the present disclosure provide techniques for reducing channel state information (CSI) measurements and calculations by user equipments (UEs) based on a maximum number of multiple-input multiple-output (MIMO) layers the UE is expected to receive.

In aspects of the present disclosure, a subset of CSI-RS resources assigned to a UE may be processed by the UE to generate associated CSI reports, for example, based on the maximum number of MIMO layers the UE is expected to receive.

According to aspects of the present disclosure, a base station (e.g., a gNB) may configure a UE with one or more CSI report configurations including one or more CSI-RS resources, wherein each CSI-RS resource includes a resource set (e.g., a set of time and frequency resources), resource settings, and/or a set of ports for the UE to measure when reporting CSI according to that CSI report configuration.

In aspects of the present disclosure, the UE is expected to process only CSI-RS resources (e.g., time and frequency resources in a resource subset) in the active BWP assigned to the UE.

According to aspects of the present disclosure, a UE may calculate CSI based on a subset of ports of a configured CSI-RS resource when the UE obtains an indication (e.g., a BWP assignment with a reduced number of maximum MIMO layers) that the UE is expected to receive a maximum number of MIMO layers less than a capability of the UE to receive MIMO layers.

In aspects of the present disclosure, a UE may calculate CSI based on a subset of CSI-RS resources of a configured CSI-RS resource set when the UE obtains an indication (e.g., a BWP assignment with a reduced number of maximum MIMO layers) that the UE is expected to receive a maximum number of MIMO layers less than a capability of the UE to receive MIMO layers.

According to aspects of the present disclosure, a UE may calculate CSI based on a subset of CSI-RS resource sets (e.g., when the UE has been configured to report CSI on a plurality of CSI-RS resource sets) when the UE obtains an indication (e.g., a BWP assignment with a reduced number of MIMO layers) that the UE is expected to receive a maximum number of MIMO layers less than a capability of the UE to receive MIMO layers.

In aspects of the present disclosure, a UE may calculate CSI based on any combination of the above subset of ports of a configured CSI-RS resource, the subset of CSI-RS resources, and/or the subset of CSI-RS resource sets when the UE obtains an indication (e.g., a BWP assignment with a reduced number of MIMO layers) that the UE is expected to receive a maximum number of MIMO layers less than a capability of the UE to receive MIMO layers. For example, a UE may be configured with a CSI report configuration to measure CSI on a CSI-RS resource set with 4 CSI-RS resources, wherein each CSI-RS resource includes 8 ports. In this case, if the UE obtains an indication (e.g., a BWP assignment with a reduced number of MIMO layers) that the UE is expected to receive a maximum number of MIMO layers less than a capability of the UE to receive MIMO layers, then the UE may process only 2 ports of the first CSI-RS resource, or the UE may process only 2 ports of each of all 4 resources.

According to aspects of the present disclosure, a BS (e.g., a gNB) may determine which ports, CSI-RS resources, CSI-RS resource sets, and/or CSI-RS settings were processed by a UE that is reporting CSI based on the whether the UE is expected to receive a maximum number of MIMO layers less than a capability of the UE to receive MIMO layers.

In aspects of the present disclosure, a UE may indicate in a CSI report to a BS which ports, CSI-RS resources, CSI-RS resource sets, and/or CSI-RS settings were processed by the UE that is reporting CSI based on the UE being expected to receive a maximum number of MIMO layers less than a capability of the UE to receive MIMO layers.

According to aspects of the present disclosure, there may be a defined or configured (e.g., by a BS) order of importance of CSI-RS resources, CSI-RS resource sets, ports, and/or CSI-RS settings, and a UE may report (e.g., in a CSI report) the number of CSI-RS resources, CSI-RS resource sets, ports, and/or CSI-RS settings that were processed (e.g., 5) by the UE in calculating the CSI. Then, the BS receiving the CSI report (with the indicated number) determines that the CSI-RS resources, CSI-RS resource sets, ports, and/or CSI-RS settings up to the indicated number (e.g. fifth) CSI-RS resource, CSI-RS resource set, port, and/or CSI-RS setting in the predefined or pre-configured order were processed by the UE to calculate the CSI in the report.

In aspects of the present disclosure, which CSI-RS resources are processed by a UE to calculate a CSI depends on a prioritization of the associated CSI reports.

According to aspects of the present disclosure, when a UE is triggered to report CSI according to 2 CSI report configurations having equal priorities, with each CSI report configuration associated with a different resource set, each resource set including multiple CSI-RS resources, and each CSI-RS resource having multiple ports, the UE may sample (e.g., subsample) across the resources associated with both CSI report configurations.

In aspects of the present disclosure, when a UE is triggered to report CSI according to 2 CSI report configurations having different priorities, with each CSI report configuration associated with a different resource set, each resource set including multiple CSI-RS resources, and each CSI-RS resource having multiple ports, the UE may only process the report having the higher priority.

According to aspects of the present disclosure, a UE may determine the priority of each CSI report configuration according to priority rules that are used for PUSCH/PUCCH prioritization and collision (e.g., as described above).

In aspects of the present disclosure, prioritization of CSI report configurations (e.g., for determining a subset of resources to process to report CSI when the UE is expected to receive a maximum number of MIMO layers less than a capability of the UE to receive MIMO layers) may be based on time-domain behavior, content of the corresponding CSI report, a serving cell (e.g., primary or secondary cell) corresponding to the CSI report, and an identifier corresponding to the report configuration (e.g., reportConfigID). For example, a UE may receive a configuration for aperiodic CSI (AP-CSI) reports and another configuration for semi-persistently scheduled CSI (SP-CSI) reports. In this case, time-domain behavior may be used as a prioritization criterion, and thus the AP CSI report may have a higher priority than the SP CSI report. Further, if the UE is allowed to focus on one of the reports, then the UE may determine to focus on the AP-CSI report, for example, due to the higher priority. Thus, if the UE can only process 2 ports, for example, then the UE may determine to process 2 ports of the AP-CSI report, and no ports of the SP-CSI report. In this case, the UE may not process all of the ports of the AP-CSI report. Additionally or alternatively, the UE may not follow a subsample approach, such as processing 1 port from the AP-CSI report configuration and 1 port from the SP-CSI report configuration.

According to aspects of the present disclosure, prioritization of CSI report configurations (e.g., for determining a subset of resources on which to report CSI when the UE is expected to receive a maximum number of MIMO layers less than a capability of the UE to receive MIMO layers) may be based on one or more prioritization rules different from previously known prioritization rules that are used for PUSCH/PUCCH prioritization and collision (e.g., as described above). Thus, if the prioritization used indicates that 2 CSI report configurations are of equal priority, which is not possible in previously known prioritization rules, then a UE may process an equal number of ports, CSI-RS resources, CSI-RS resource sets, and/or CSI-RS settings from each of the CSI report configurations.

In aspects of the present disclosure, a UE configured to receive a maximum number of MIMO layers less than a capability of the UE (e.g., in a low power mode and/or assigned to a power-saving BWP), may measure all of the CSI-RS resources in a CSI report configuration in a sweeping pattern during multiple time slots (e.g., CSI resource occasions, e.g., symbols, slots, or subframes), as opposed to measuring the CSI-RS resources during one slot when the UE is in a normal mode (e.g., configured to receive a maximum number of MIMO layers equal to a capability of the UE).

According to aspects of the present disclosure, the above-described sweeping pattern may be done over ports, CSI resources, and/or CSI resource sets on CSI resource occasions, so that the UE can measure more of the CSI resources (e.g., ports) over a time period than the UE can measure in one time slot.

For example, a UE may be configured with a CSI report configuration to measure CSI on 8 ports (total) when the UE is in a normal mode. In this example, the UE can be configured with a sweeping pattern such that each the UE measures only two ports during each time period for measuring CSI. The ports may be measured in an order of port number: ports (0,1), (2,3), (4,5), and then (6,7). The number of ports to be measured in each time slot may be changed over time, where the UE may measure CSI for ports (0,1, 2,3), (4,5), (6,7), (0,1), (2,3), and then (4,5,6,7), for example.

In aspects of the present disclosure, when a UE is sweeping over ports, CSI resources, and/or CSI resource sets as described above, the UE may compute the precoding matrix indicator (PMI), rank indicator (RI), and/or channel quality indicator (CQI) based on the maximum number of layers the UE is expected to receive (e.g., less than the capability of the UE) independently for each CSI report occasion.

According to aspects of the present disclosure, when a UE is sweeping over ports, CSI resources, and/or CSI resource sets as described above, the UE may compute the PMI, RI, and/or CQI based on the union set of all layers and/or ports contained by the sweeping pattern by combining channel estimates from CSI report occasions in the sweeping pattern.

In aspects of the present disclosure, CSI computation complexity may be reduced by a UE's limiting the RI to the maximum number of MIMO layers that the UE is configured to receive. That is, the CSI computation complexity may be reduced by limiting the RI in each CSI report to the maximum number of MIMO layers the UE is expected to receive.

According to aspects of the present disclosure, CSI measurements by a UE configured for carrier aggregation (CA) may be reduced by reducing the number of measurements in dormant BWPs to match the maximum number of MIMO layers the UE is expected to receive. Thus, if the number of MIMO layers the UE is expected to receive is reduced for a UE configured for CA (e.g., a PCell PDSCH+an SCell CSI for a dormant BWP), then CSI report calculations may be reduced by configuring the UE with a constraint that the number of layers for SCell reception cannot be larger than the number of layers for PCell reception.

In intra-band CA (e.g., carrier aggregation where the primary cell and at least one secondary cell operate on a same frequency band), the SCell(s) that a UE is configured to monitor may share the same RF resources for monitoring the PCell with which the UE is configured. That is, a UE configured for intra-band CA may monitor a SCell using the same reception antennas as the UE used to monitor the PCell.

According to aspects of the present disclosure, a UE configured for intra-band CA may not monitor ports in the SCell that are not monitored in the PCell.

In aspects of the present disclosure, a UE configured for intra-band CA may time-align the RF activities of the cells as much as possible. For example, CSI measurement occasions of SCells should be configured as a subset of PCell measurement occasions.

Figure 4:
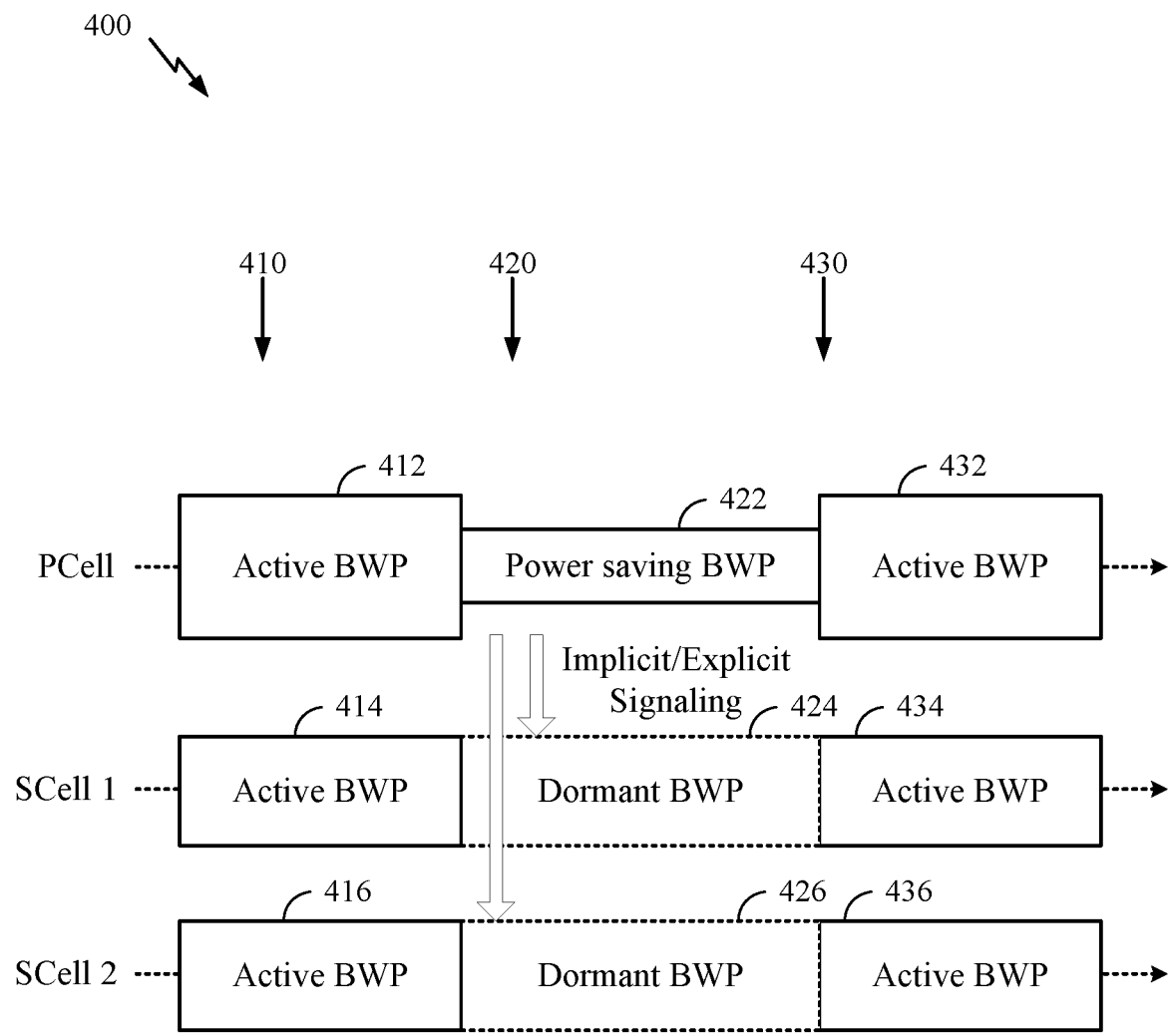
FIG. 4 is an exemplary timeline of a UE configured for intra-band carrier aggregation, in accordance with aspects of the present disclosure.

FIG. 4 is an exemplary timeline 400 of a UE configured for intra-band CA, in accordance with aspects of the present disclosure. As shown, at 410, the UE is configured with an active BWP 412 on a PCell and active BWPs 414 and 416 on two SCells. At 420, the UE is configured with a power saving BWP 422 on the PCell, wherein the UE is configured to receive a maximum number of MIMO layers that is less than the capability of the UE. As described above, the UE may determine CSI-RS resources, CSI-RS resource sets, ports, and/or CSI-RS settings for a configures CSI report based on the UE being configured to receive the maximum number of MIMO layers that is less than the capability of the UE. When the UE is configured with the power saving BWP 422 on the PCell, the UE treats the two SCells as dormant BWPs, in which the UE does not monitor for PDCCHs, does not receive PDSCHs, but does perform measurements (e.g., CSI) and report (e.g., CSI reports) on those measurements. As described above, the UE calculates CSI for the SCells based on the maximum number of MIMO layers that the UE is configured to receive for the PCell. Also, the UE measures the SCells at times aligned with measurements of the PCell by the UE. The configuration of the UE to treat the SCells as dormant may be in response to explicit signaling, and/or may be implied by the UE being configured with the power-saving BWP on the PCell. At 430, the UE is configured with the active BWP 432 on the PCell and active BWPs 434 and 436 on the two SCells.

According to aspects of the present disclosure, a UE may prioritize CSI report configurations based on changes of the available CPUs of the UE.

In aspects of the present disclosure, a UE may decrease the number of available CPUs on a slot, or subframe, or frame basis. The UE may decrease the number of available CPUs to a value lower than that reported in a capability message from the UE to a BS.

According to aspects of the present disclosure, a UE may decrease the number of CPUs from a nominal value to different values for different BWPs.

In aspects of the present disclosure, a UE may report to a serving BS a new number of available of CPUs when the available CPUs of the UE have changed. The report of the changed number of available CPUs may be included in a CSI report or may be a separate report sent by the UE, for example, via a PUCCH.

According to aspects of the present disclosure, a BS (e.g., a gNB) may configure a UE to report the current number of available CPUs in a periodic fashion, and the UE may then report the number of available CPUs periodically.

In aspects of the present disclosure, a UE may be configured via a medium access control (MAC) control element (CE) to report on a current number of available CPUs on a semi-persistent basis.

According to aspects of the present disclosure, a UE may be triggered via a downlink control information (DCI) to report on a current number of available CPUs (e.g., dynamic reporting of CPUs).

In aspects of the present disclosure, whenever available CPUs of a UE are changing, there may be a minimum amount of time that the new number of available CPUs is expected to be valid. That is, when a new number of available CPUs is reported, the new number is expected to be valid for X slots, subframes, or frames.

Figure 5:
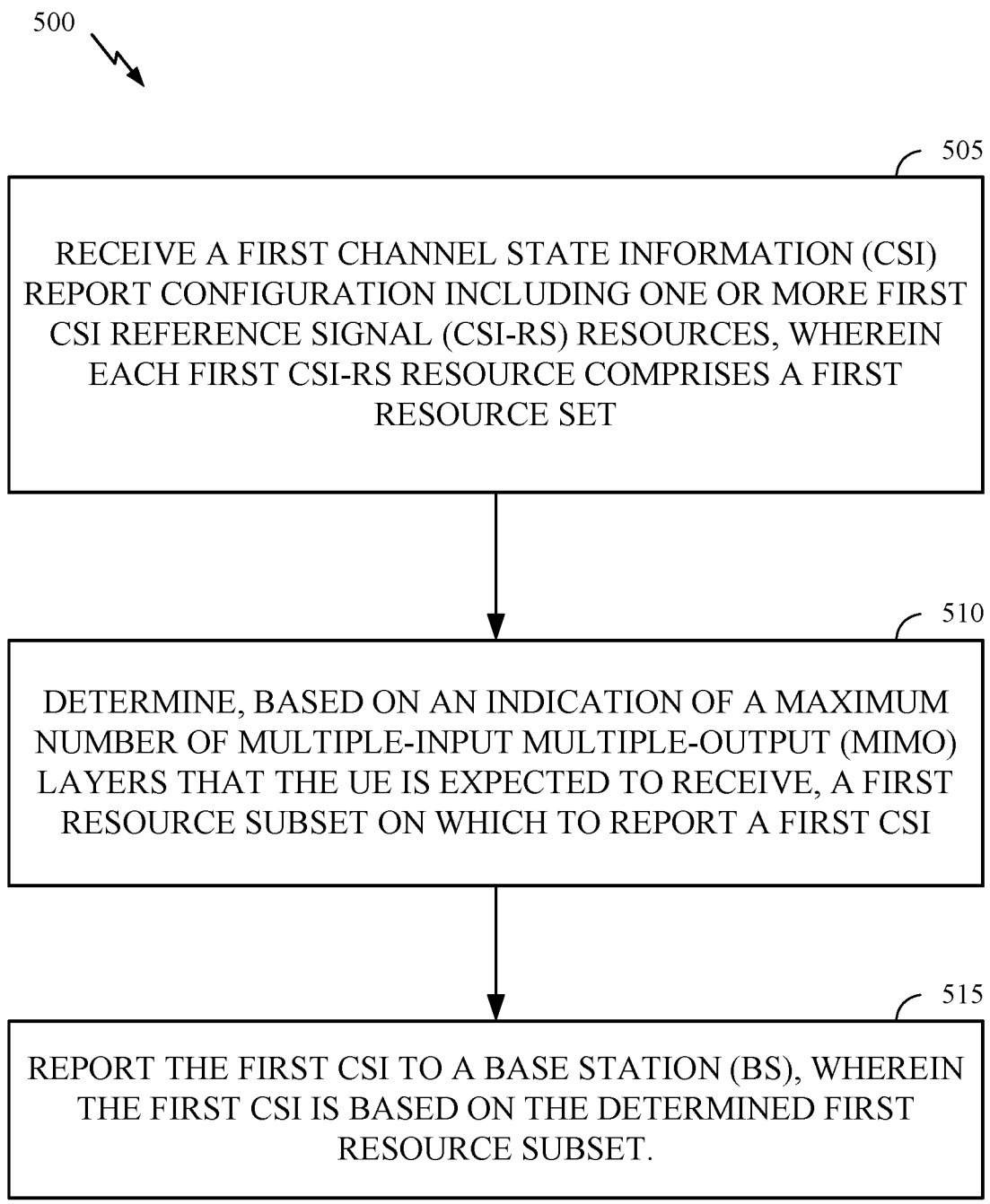
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., the UE 120a in the wireless communication network 100). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, by the UE receiving a first channel state information (CSI) report configuration including one or more first CSI reference signal (CSI-RS) resources, wherein each first CSI-RS resource comprises a first resource set.

At block 510, operations 500 continue with the UE determining, based on an indication of a maximum number of multiple-input multiple-output (MIMO) layers that the UE is expected to receive, a first resource subset on which to report first CSI.

Operations 500 continue at block 515 with the UE reporting the first CSI to a base station (BS), wherein the first CSI is based on the determined first resource subset.

Figure 6:
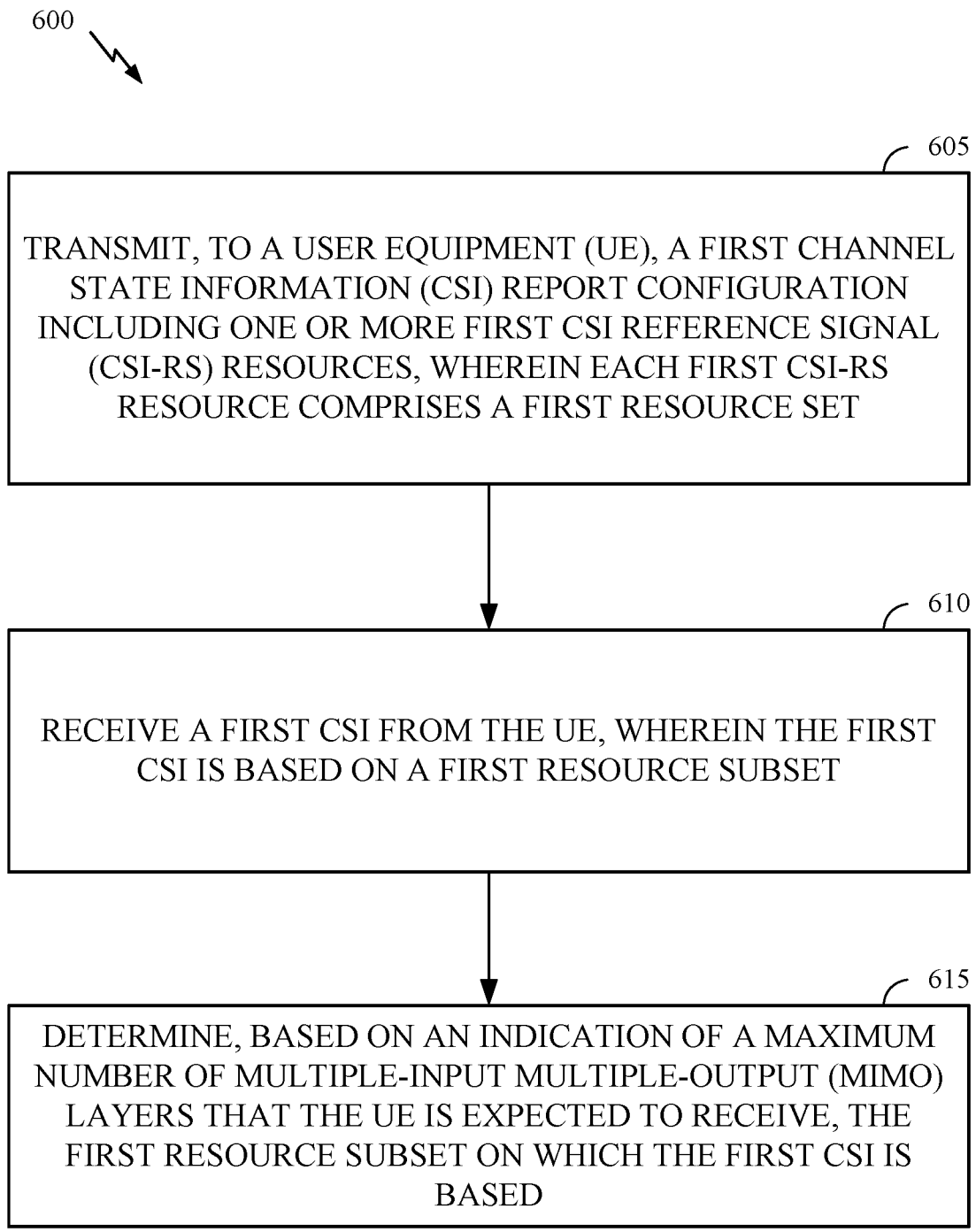
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as a BS 110a in the wireless communication network 100). The operations 600 may be complimentary operations by the BS to the operations 500 performed by the UE. Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, by the BS transmitting, to a user equipment (UE), a first channel state information (CSI) report configuration including one or more first CSI reference signal (CSI-RS) resources, wherein each first CSI-RS resource comprises a first resource set.

At block 610, operations 600 may continue with the BS receiving the first CSI from the UE, wherein the first CSI is based on a first resource subset.

Operations 600 may continue at block 615 with the BS determining, based on an indication of a maximum number of multiple-input multiple-output (MIMO) layers that the UE is expected to receive, the first resource subset on which the first CSI is based.

Figure 7:
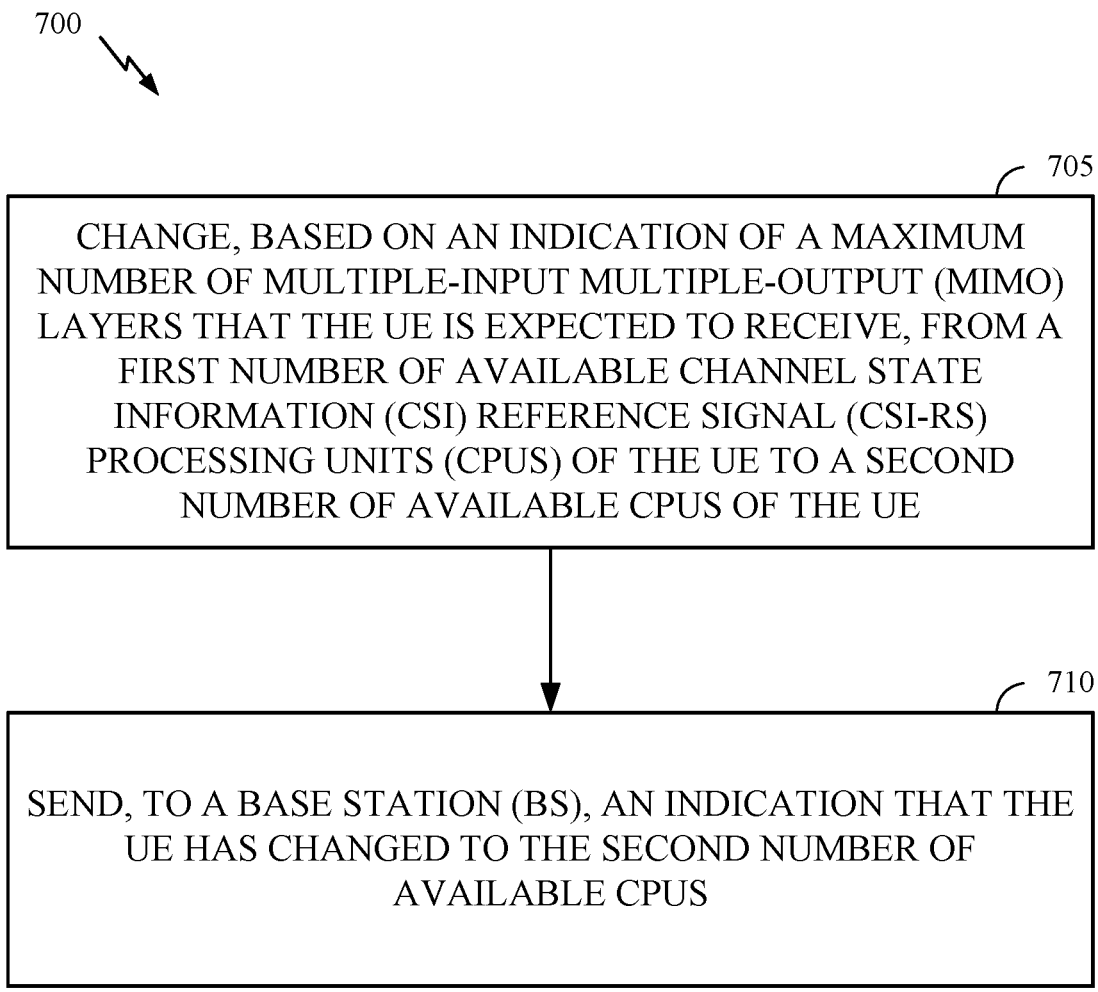
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as the UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, by the UE changing, based on an indication of a maximum number of multiple-input multiple-output (MIMO) layers that the UE is expected to receive, from a first number of available channel state information (CSI) reference signal (CSI-RS) processing units (CPUs) of the UE to a second number of available CPUs of the UE.

At block 710, operations 700 continue with the UE sending, to a base station (BS), an indication that the UE has changed to the second number of available CPUs.

Figure 8:
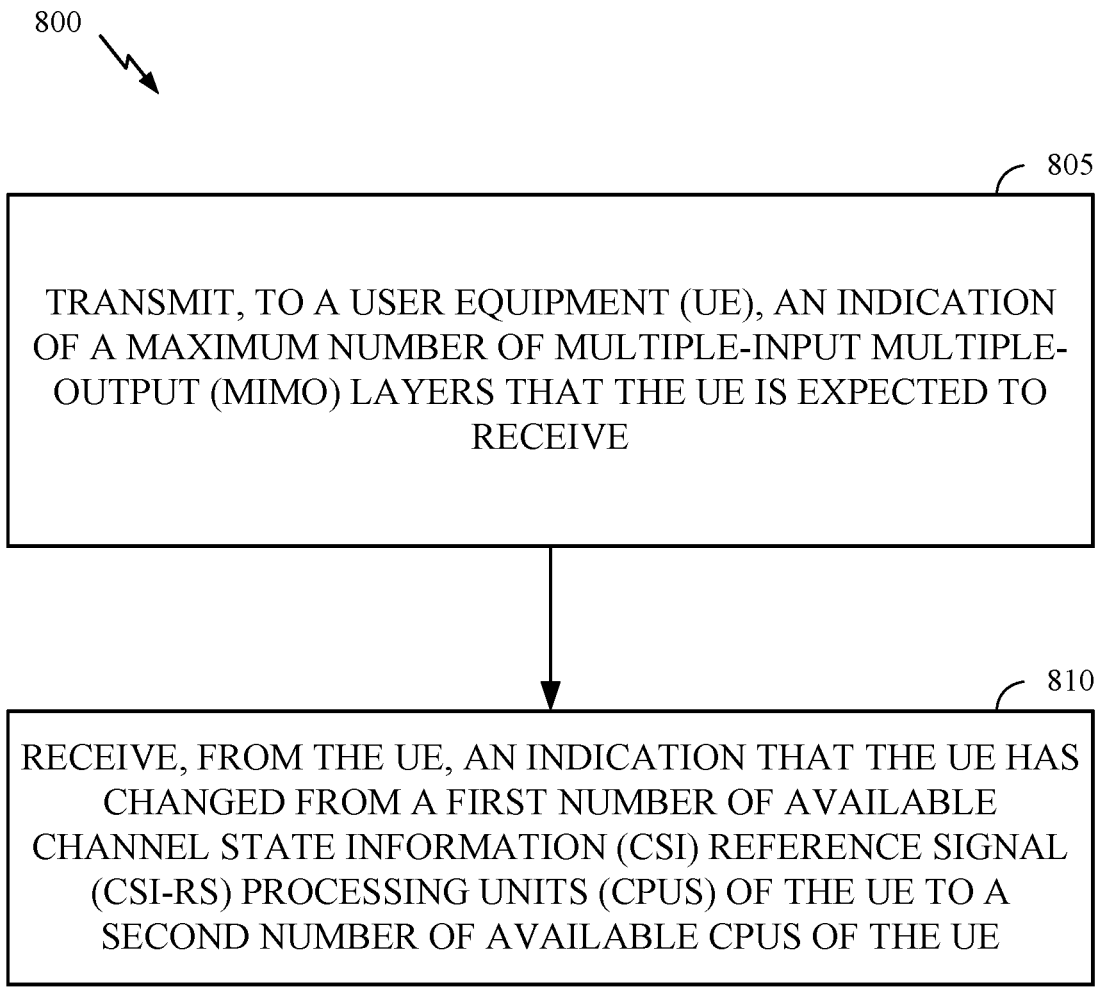
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as a BS 110a in the wireless communication network 100). The operations 800 may be complimentary operations by the BS to the operations 500 performed by the UE. Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at block 805, by the BS transmitting, to a user equipment (UE), an indication of a maximum number of multiple-input multiple-output (MIMO) layers that the UE is expected to receive.

At block 810, operations 800 may continue with the BS receiving, from the UE, an indication that the UE has changed from a first number of available channel state information (CSI) reference signal (CSI-RS) processing units (CPUs) of the UE to a second number of available CPUs of the UE.

Figure 9:
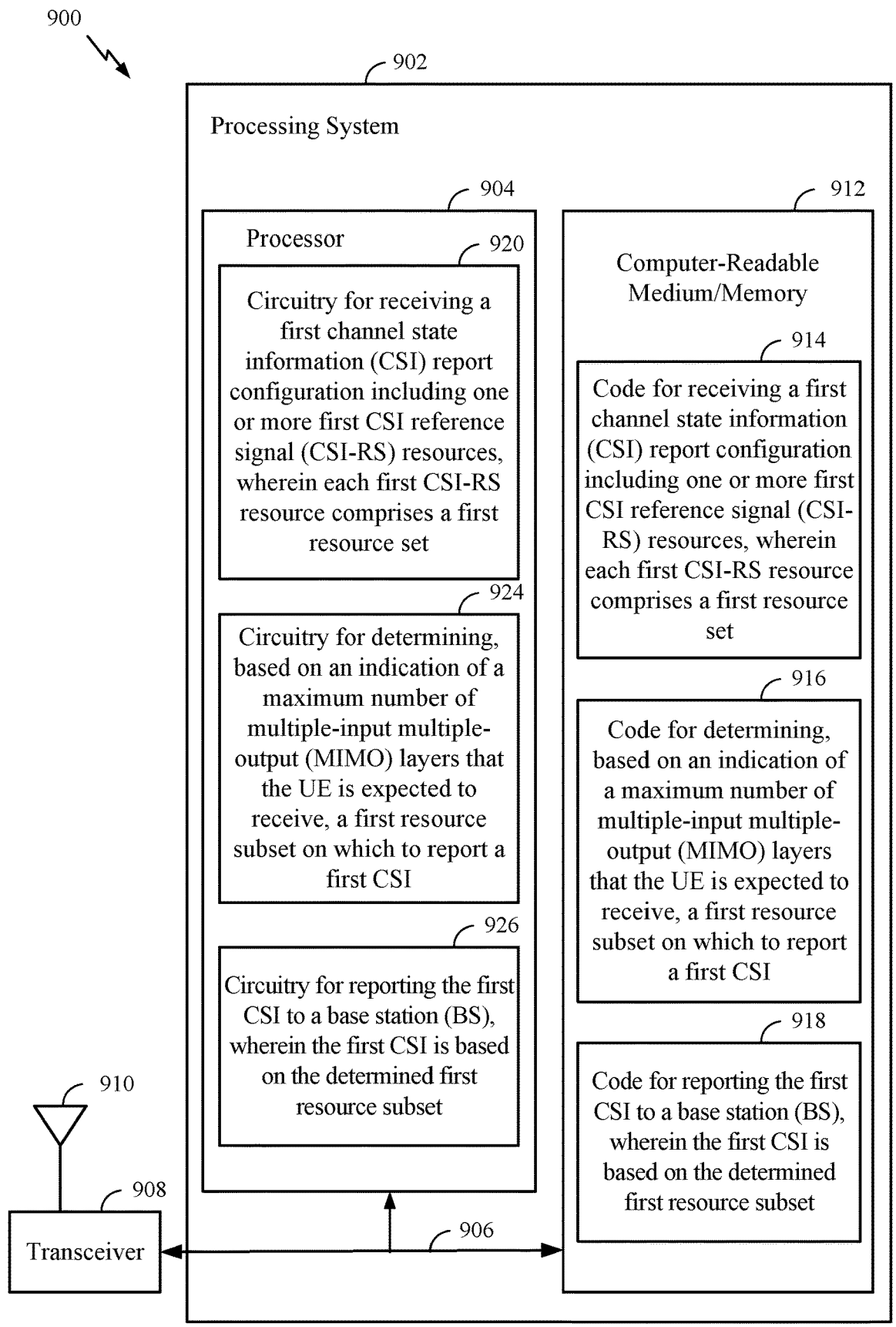
FIG. 9 illustrates a communications device that may include various components configured to perform the operations illustrated in FIG. 5, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 or communications device 900 to perform the operations illustrated in FIG. 5, or other operations for performing the various techniques discussed herein for reducing channel state information (CSI) measurements and calculations by user equipments (UEs) assigned to receive reduced numbers of maximum multiple-input multiple-output (MIMO) layers. In certain aspects, computer-readable medium/memory 912 stores code 914 for receiving a first channel state information (CSI) report configuration including one or more first CSI reference signal (CSI-RS) resources, wherein each first CSI-RS resource comprises a first resource set; code 916 for determining, based on an indication of a maximum number of multiple-input multiple-output (MIMO) layers that the UE is expected to receive, a first resource subset on which to report first CSI, and code 918 for reporting the first CSI to a base station (BS), wherein the first CSI is based on the determined first resource subset. In certain aspects, the processor 904 has circuitry configured to implement the code stored in the computer-readable medium/memory 912. The processor 904 includes circuitry 920 for receiving a first channel state information (CSI) report configuration including one or more first CSI reference signal (CSI-RS) resources, wherein each first CSI-RS resource comprises a first resource set; circuitry 924 for determining, based on an indication of a maximum number of multiple-input multiple-output (MIMO) layers that the UE is expected to receive, a first resource subset on which to report first CSI, and circuitry 926 for reporting the first CSI to a base station (BS), wherein the first CSI is based on the determined first resource subset.

Figure 10:
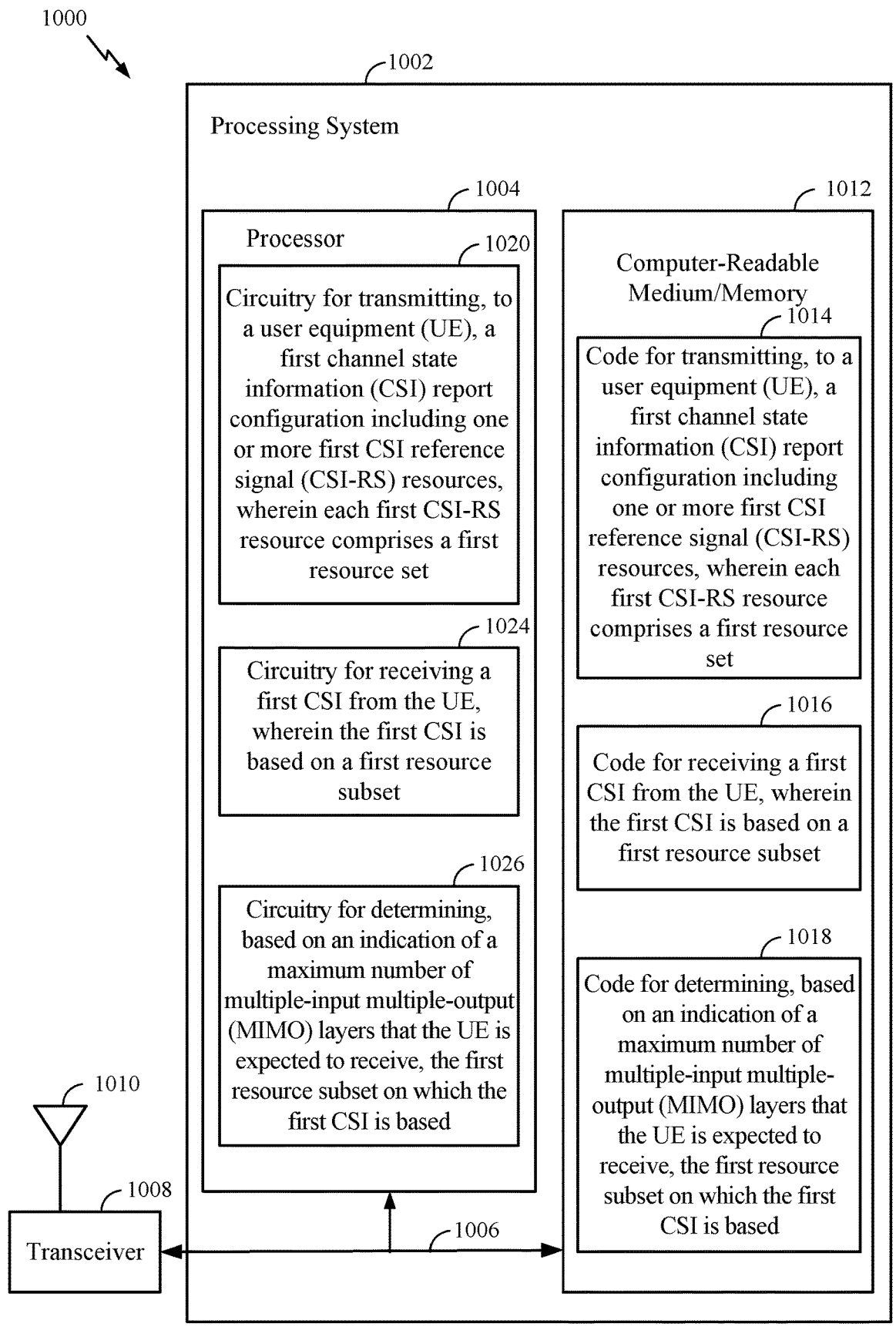
FIG. 10 illustrates a communications device that may include various components configured to perform the operations illustrated in FIG. 6, herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 6. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 or communications device 1000 to perform the operations illustrated in FIG. 6, or other operations for performing the various techniques discussed herein for reducing channel state information (CSI) measurements and calculations by user equipments (UEs) assigned to receive reduced numbers of multiple-input multiple-output (MIMO) layers. In certain aspects, computer-readable medium/memory 1012 stores code 1014 for transmitting, to a user equipment (UE), a first channel state information (CSI) report configuration including one or more first CSI reference signal (CSI-RS) resources, wherein each first CSI-RS resource comprises a first resource set; code 1016 for receiving the first CSI from the UE, wherein the first CSI is based on a first resource subset, and code 1018 for determining, based on an indication of a maximum number of multiple-input multiple-output (MIMO) layers that the UE is expected to receive, the first resource subset on which the first CSI is based. In certain aspects, the processor 1004 has circuitry configured to implement the code stored in the computer-readable medium/memory 1012. The processor 1004 includes circuitry 1020 for transmitting, to a user equipment (UE), a first channel state information (CSI) report configuration including one or more first CSI reference signal (CSI-RS) resources, wherein each first CSI-RS resource comprises a first resource set; circuitry 1024 for receiving the first CSI from the UE, wherein the first CSI is based on a first resource subset, and circuitry 1026 for determining, based on an indication of a maximum number of multiple-input multiple-output (MIMO) layers that the UE is expected to receive, the first resource subset on which the first CSI is based.

Figure 11:
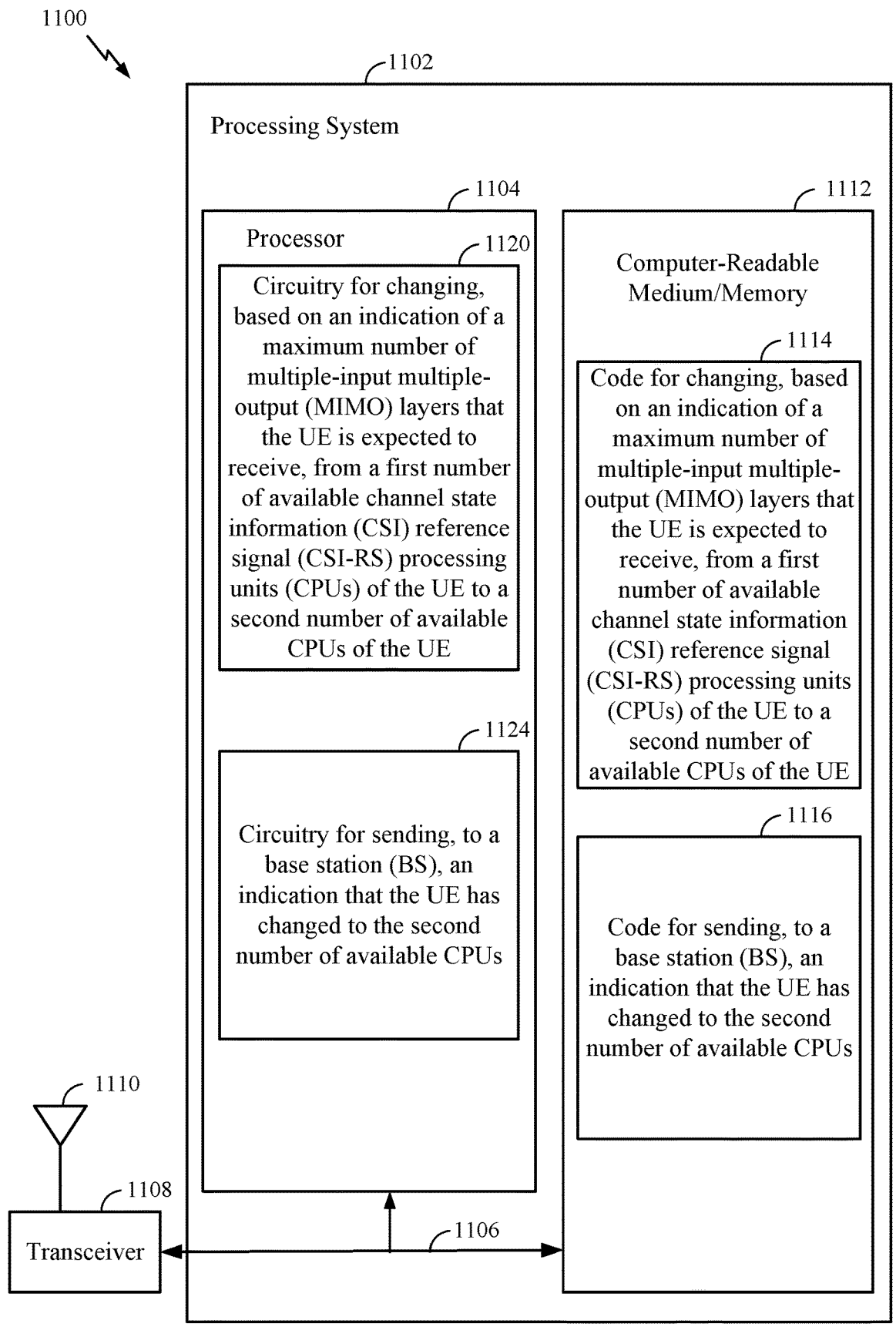
FIG. 11 illustrates a communications device that may include various components configured to perform the operations illustrated in FIG. 7, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 7. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 or communications device 1100 to perform the operations illustrated in FIG. 7, or other operations for performing the various techniques discussed herein for reducing channel state information (CSI) measurements and calculations by user equipments (UEs) assigned to receive reduced numbers of multiple-input multiple-output (MIMO) layers. In certain aspects, computer-readable medium/memory 1112 stores code 1114 for changing, based on an indication of a maximum number of multiple-input multiple-output (MIMO) layers that the UE is expected to receive, from a first number of available channel state information (CSI) reference signal (CSI-RS) processing units (CPUs) of the UE to a second number of available CPUs of the UE; and code 1116 for sending, to a base station (BS), an indication that the UE has changed to the second number of available CPUs. In certain aspects, the processor 1104 has circuitry configured to implement the code stored in the computer-readable medium/memory 1112. The processor 1104 includes circuitry 1120 for changing, based on an indication of a maximum number of multiple-input multiple-output (MIMO) layers that the UE is expected to receive, from a first number of available channel state information (CSI) reference signal (CSI-RS) processing units (CPUs) of the UE to a second number of available CPUs of the UE; and circuitry 1124 for sending, to a base station (BS), an indication that the UE has changed to the second number of available CPUs.

Figure 12:
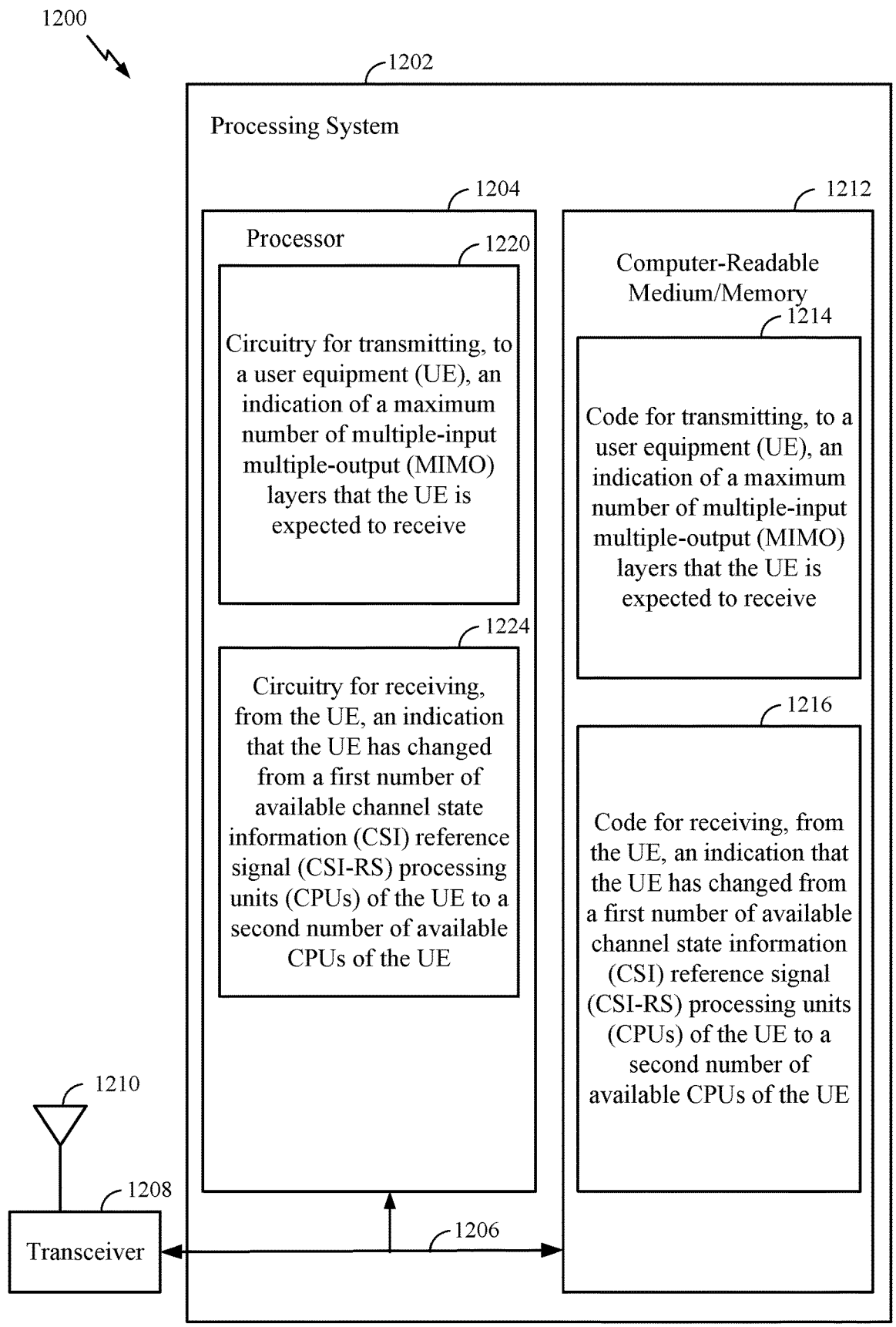
FIG. 12 illustrates a communications device that may include various components configured to perform the operations illustrated in FIG. 8, herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 or communications device 1200 to perform the operations illustrated in FIG. 8, or other operations for performing the various techniques discussed herein for reducing channel state information (CSI) measurements and calculations by user equipments (UEs) assigned to receive reduced numbers of multiple-input multiple-output (MIMO) layers. In certain aspects, computer-readable medium/memory 1212 stores code 1214 for transmitting, to a user equipment (UE), an indication of a maximum number of multiple-input multiple-output (MIMO) layers that the UE is expected to receive; and code 1216 for receiving, from the UE, an indication that the UE has changed from a first number of available channel state information (CSI) reference signal (CSI-RS) processing units (CPUs) of the UE to a second number of available CPUs of the UE. In certain aspects, the processor 1204 has circuitry configured to implement the code stored in the computer-readable medium/memory 1212. The processor 1204 includes circuitry 1220 for transmitting, to a user equipment (UE), an indication of a maximum number of multiple-input multiple-output (MIMO) layers that the UE is expected to receive; and circuitry 1224 for receiving, from the UE, an indication that the UE has changed from a first number of available channel state information (CSI) reference signal (CSI-RS) processing units (CPUs) of the UE to a second number of available CPUs of the UE.

Example Embodiments

Embodiment 1: A method for wireless communications performed by a user equipment (UE), comprising receiving a first channel state information (CSI) report configuration including one or more first CSI reference signal (CSI-RS) resources, wherein each first CSI-RS resource comprises a first resource set; determining, based on an indication of a maximum number of multiple-input multiple-output (MIMO) layers that the UE is expected to receive, a first resource subset on which to report a first CSI; and reporting the first CSI to a base station (BS), wherein the first CSI is based on the determined first resource subset.

Embodiment 2: The method of Embodiment 1, wherein the first resource subset comprises at least one of a subset of a first set of ports of a first CSI-RS resource in the first CSI report configuration; a subset of the first resource set of a first CSI-RS resource in the first CSI report configuration; or a subset of one or more the first CSI-RS resources in the first CSI report configuration, wherein the first CSI report configuration includes a plurality of first CSI-RS resources.

Embodiment 3: The method of Embodiment 1 or 2, wherein the indication of the maximum number of MIMO layers comprises an assignment of an active bandwidth part (BWP) to the UE.

Embodiment 4: The method of any of Embodiments 1-3, wherein reporting the first CSI comprises reporting to the BS the first resource subset on which the first CSI is based.

Embodiment 5: The method of any of Embodiments 1-4, further comprising calculating a sum of a number of ports in the first resource subset, a number of resources of the first resource set in the first resource subset, and a number of the one or more first CSI-RS resources in the first resource subset, wherein reporting the first CSI comprises reporting the sum to the BS.

Embodiment 6: The method of any of Embodiments 1-5, further comprising receiving a second CSI report configuration including one or more second CSI-RS resources, wherein each second CSI-RS resource comprises a second resource set and a second set of ports; obtaining a first trigger to report the first CSI according to the first CSI report configuration; obtaining a second trigger to report a second CSI according to the second CSI report configuration; and determining, based on a first priority of the first CSI report configuration being equal to a second priority of the second CSI report configuration, to report the first CSI and the second CSI, wherein the second CSI is based on a second resource subset.

Embodiment 7: The method of Embodiment 6, wherein the second resource subset comprises at least one of a subset of the second set of ports; a subset of the second resource set; or a subset of the second CSI-RS resources.

Embodiment 8: The method of Embodiment 6 or 7, wherein the first priority is based on a time-domain behavior of the first CSI, content of the first CSI, a first serving cell corresponding to the first CSI, and a first identifier (ID) corresponding to the first CSI report configuration; and the second priority is based on a time-domain behavior of the second CSI, content of the second CSI, a second serving cell corresponding to the second CSI, and a second identifier (ID) corresponding to the second CSI report configuration.

Embodiment 9: The method of any of Embodiments 1-8, further comprising receiving a second CSI report configuration including one or more second CSI reference signal (CSI-RS) resources, wherein each second CSI-RS resource comprises a second resource set and a second set of ports; obtaining a trigger to report the first CSI according to the first CSI report configuration and a second CSI according to the second CSI report configuration; and determining, based on a first priority of the first CSI report configuration being higher than a second priority of the second CSI report configuration, to report the first CSI and drop the second CSI.

Embodiment 10: The method of Embodiment 9, wherein the first priority is based on a time-domain behavior of the first CSI, content of the first CSI, a first serving cell corresponding to the first CSI, and a first identifier (ID) corresponding to the first CSI report configuration; and the second priority is based on a time-domain behavior of the second CSI, content of the second CSI, a second serving cell corresponding to the second CSI, and a second identifier (ID) corresponding to the second CSI report configuration.

Embodiment 11: The method of any of Embodiments 1-10, further comprising receiving a second CSI report configuration including one or more second CSI reference signal (CSI-RS) resources, wherein each second CSI-RS resource comprises a second resource set and a second set of ports; obtaining a trigger to report the first CSI according to the first CSI report configuration and a second CSI according to the second CSI report configuration; and determining, based on a first priority of the first CSI report configuration being higher than a second priority of the second CSI report configuration, the first resource subset.

Embodiment 12: The method of any of Embodiments 1-11, further comprising receiving a second CSI report configuration including one or more second CSI reference signal (CSI-RS) resources, wherein each second CSI-RS resource comprises a second resource set and a second set of ports; obtaining a first trigger to report the first CSI according to the first CSI report configuration; obtaining a second trigger to report a second CSI according to the second CSI report configuration; and determining, based on a first priority of the first CSI report configuration being equal to a second priority of the second CSI report configuration, to report the first CSI and the second CSI, wherein the first resource subset is further determined based on the first priority being equal to the second priority, and the method further comprises determining, based on the indication of the maximum number of MIMO layers that the UE is expected to receive, a second resource subset on which to report second CSI; and reporting the second CSI to the BS, wherein the second CSI is based on the second resource subset.

Embodiment 13: The method of Embodiment 12, wherein the second resource subset comprises at least one of a subset of the second set of ports of a second CSI-RS resource in the second CSI report configuration; a subset of the second resource set of a second CSI-RS resource in the second CSI report configuration; or a subset of the second CSI-RS resources in the second CSI report configuration, wherein the second CSI report configuration includes a plurality of second CSI-RS resources.

Embodiment 14: The method of any of Embodiments 1-13, further comprising determining, based on a sweeping pattern of the one or more first CSI-RS resources over multiple time slots, the first resource subset.

Embodiment 15: The method of Embodiment 14, wherein reporting the first CSI comprises reporting a precoding matrix indicator (PMI), a rank indicator (RI), and a channel quality indicator (CQI) determined based on a combination of channel estimates from CSI resource occasions in the sweeping pattern.

Embodiment 16: The method of any of Embodiments 1-15, further comprising determining the first CSI while limiting a rank indicator (RI) of the first CSI to the maximum number of MIMO layers that the UE is expected to receive.

Embodiment 17: The method of any of Embodiments 1-16, wherein the maximum number of MIMO layers that the UE is expected to receive is for a primary cell, and the method further comprises measuring a second CSI for a secondary cell operating in a same frequency band as the primary cell based on the first resource subset.

Embodiment 18: The method of any of Embodiments 1-17, wherein the maximum number of MIMO layers that the UE is expected to receive is for a primary cell, and the method further comprises measuring a second CSI for a secondary cell operating in a same frequency band as the primary cell at times corresponding to the first resource subset.

Embodiment 19: A method for wireless communications performed by a user equipment (UE), comprising changing, based on an indication of a maximum number of multiple-input multiple-output (MIMO) layers that the UE is expected to receive, from a first number of available channel state information (CSI) reference signal (CSI-RS) processing units (CPUs) of the UE to a second number of available CPUs of the UE; and sending, to a base station (BS), an indication that the UE has changed to the second number of available CPUs.

Embodiment 20: The method of Embodiment 19, wherein the indication of the maximum number of MIMO layers comprises an assignment of an active bandwidth part (BWP) to the UE.

Embodiment 21: The method of Embodiment 19 or 20, wherein changing to the second number of available CPUs comprises changing on a slot, subframe, or frame basis.

Embodiment 22: The method of any of Embodiments 19-21, wherein sending the indication that the UE has changed to the second number of available CPUs comprises sending the indication in a CSI report to the BS.

Embodiment 23: The method of any of Embodiments 19-22, wherein sending the indication that the UE has changed to the second number of available CPUs comprises sending the indication via a physical uplink control channel (PUCCH).

Embodiment 24: The method of any of Embodiments 19-23, wherein sending the indication that the UE has changed to the second number of available CPUs comprises sending the indication on a periodic basis.

Embodiment 25: The method of any of Embodiments 19-24, further comprising receiving a medium access control (MAC) control element (CE) requesting the UE to report a current number of available CPUs, wherein sending the indication that the UE has changed to the second number of available CPUs is in response to receiving the MAC CE.

Embodiment 26: The method of any of Embodiments 19-25, further comprising receiving a downlink control information (DCI) requesting the UE to report a current number of available CPUs, wherein sending the indication that the UE has changed to the second number of available CPUs is in response to receiving the DCI.

Embodiment 27: A method for wireless communications performed by a base station (BS), comprising transmitting, to a user equipment (UE), a first channel state information (CSI) report configuration including one or more first CSI reference signal (CSI-RS) resources, wherein each first CSI-RS resource comprises a first resource set; receiving a first CSI from the UE, wherein the first CSI is based on a first resource subset; and determining, based on an indication of a maximum number of multiple-input multiple-output (MIMO) layers that the UE is expected to receive, the first resource subset on which the first CSI is based.

Embodiment 28: The method of Embodiment 27, wherein the first resource subset comprises at least one of a subset of a first set of ports of a first CSI-RS resource in the first CSI report configuration; a subset of the first resource set of a first CSI-RS resource in the first CSI report configuration; or a subset of the one or more first CSI-RS resources in the first CSI report configuration, wherein the first CSI report configuration includes a plurality of first CSI-RS resources.

Embodiment 29: The method of Embodiment 27 or 28, wherein the indication of the maximum number of MIMO layers comprises an assignment of an active bandwidth part (BWP) to the UE by the BS.

Embodiment 30: The method of any of Embodiments 27-29, wherein receiving the first CSI comprises receiving a report of the first resource subset on which the first CSI is based.

Embodiment 31: The method of any of Embodiments 27-30, wherein receiving the first CSI comprises receiving a sum of a number of ports in the first resource subset, a number of resources of the first resource set in the first resource subset, and a number of the first CSI-RS resources in the first resource subset, and wherein determining the first resource subset is further based on the sum.

Embodiment 32: The method of any of Embodiments 27-31, further comprising transmitting, to the UE, a second CSI report configuration including one or more second CSI reference signal (CSI-RS) resources, wherein each second CSI-RS resource comprises a second resource set and a second set of ports; receiving a second CSI from the UE, wherein the second CSI is based on a second resource subset; and determining, based on an indication of a maximum number of multiple-input multiple-output (MIMO) layers that the UE is expected to receive, the second resource subset on which the second CSI is based.

Embodiment 33: The method of Embodiment 32, wherein the second resource subset comprises at least one of a subset of the second set of ports; a subset of the second resource set; or a subset of the second CSI-RS resources.

Embodiment 34: The method of any of Embodiments 27-33, wherein determining the first resource subset is further based on a sweeping pattern of the first CSI-RS resources over multiple time slots by the UE.

Embodiment 35: The method of Embodiment 34, wherein the first CSI comprises a precoding matrix indicator (PMI), a rank indicator (RI), and a channel quality indicator (CQI) determined based on a combination of channel estimates from CSI resource occasions in the sweeping pattern.

Embodiment 36: The method of any of Embodiments 27-35, wherein the first CSI is based on a rank indicator (RI) of the CSI that is limited to the maximum number of MIMO layers that the UE is expected to receive.

Embodiment 37: The method of any of Embodiments 27-36, wherein the maximum number of MIMO layers that the UE is expected to receive is for a primary cell, and the method further comprises receiving, from the UE, CSI for a secondary cell operating in a same frequency band as the primary cell based on the first resource subset.

Embodiment 38: The method of any of Embodiments 27-37, wherein the maximum number of MIMO layers that the UE is expected to receive is for a primary cell, and the method further comprises receiving, from the UE, CSI for a secondary cell operating in a same frequency band as the primary cell at times corresponding to the first resource subset.

Embodiment 39: A method for wireless communications performed by a base station (BS), comprising transmitting, to a user equipment (UE), an indication of a maximum number of multiple-input multiple-output (MIMO) layers that the UE is expected to receive; and receiving, from the UE, an indication that the UE has changed from a first number of available channel state information (CSI) reference signal (CSI-RS) processing units (CPUs) of the UE to a second number of available CPUs of the UE.

Embodiment 40: The method of Embodiment 39, wherein the indication of the maximum number of MIMO layers comprises an assignment of an active bandwidth part (BWP) to the UE by the BS.

Embodiment 41: The method of Embodiment 39 or 40, wherein the indication from the UE further indicates that the UE is changing to the second number of available CPUs on a slot, subframe, or frame basis.

Embodiment 42: The method of any of Embodiments 39-41, wherein receiving the indication that the UE has changed to the second number of available CPUs comprises receiving the indication in a CSI report from the UE.

Embodiment 43: The method of any of Embodiments 39-42, wherein receiving the indication that the UE has changed to the second number of available CPUs comprises receiving the indication via a physical uplink control channel (PUCCH) from the UE.

Embodiment 44: The method of any of Embodiments 39-43, wherein receiving the indication that the UE has changed to the second number of available CPUs comprises receiving the indication on a periodic basis.

Embodiment 45: The method of any of Embodiments 39-44, further comprising transmitting a medium access control (MAC) control element (CE) requesting the UE to report a current number of available CPUs, wherein the UE sends the indication that the UE has changed to the second number of available CPUs in response to the MAC CE.

Embodiment 46: The method of any of Embodiments 39-45, further comprising transmitting a downlink control information (DCI) requesting the UE to report a current number of available CPUs, wherein the UE sends the indication that the UE has changed to the second number of available CPUs is in response to the DCI.

Embodiment 47: The method of any of Embodiments 1-18, wherein each first CSI-RS resource further comprises a first set of ports.

Embodiment 48: The method of any of Embodiments 27-38, wherein each first CSI-RS resource further comprises a first set of ports.

Embodiment 49: An apparatus for wireless communication, comprising memory and at least one processor coupled to the memory, the memory and the at least one processor configurable or configured to perform any of the methods of Embodiments 1-48.

Embodiment 50: An apparatus for wireless communication, comprising means for performing any of the methods of Embodiments 1-48.

Embodiment 51: A computer readable medium having instructions stored thereon that, when executed by a processing system, cause the processing system to perform any of the methods of Embodiments 1-48.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining, identifying, and the like. Also, "determining" may include receiving (e.g., receiving information), accessing (e.g., accessing data in a memory) and the like. Also, "determining" may include resolving, selecting, choosing, establishing and the like.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 6, 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), comprising:
changing, based on an indication of a maximum number of multiple-input multiple-output (MIMO) layers that the UE is expected to receive, from a first number of available channel state information (CSI) reference signal (CSI-RS) processing units (CPUs) of the UE to a second number of available CPUs of the UE; and
sending, to a network entity, an indication that the UE has changed to the second number of available CPUs.

2. The method of claim 1, wherein the indication of the maximum number of MIMO layers comprises an assignment of an active bandwidth part (BWP) to the UE.

3. The method of claim 1, wherein changing to the second number of available CPUs comprises changing on a slot, subframe, or frame basis.

4. The method of claim 1, wherein sending the indication that the UE has changed to the second number of available CPUs comprises sending the indication in a CSI report to the network entity.

5. The method of claim 1, wherein sending the indication that the UE has changed to the second number of available CPUs comprises sending the indication via a physical uplink control channel (PUCCH).

6. The method of claim 1, wherein sending the indication that the UE has changed to the second number of available CPUs comprises sending the indication on a periodic basis.

7. The method of claim 1, further comprising:
receiving a medium access control (MAC) control element (CE) requesting the UE to report a current number of available CPUs, wherein sending the indication that the UE has changed to the second number of available CPUs is in response to receiving the MAC CE.

8. The method of claim 1, further comprising:
receiving a downlink control information (DCI) requesting the UE to report a current number of available CPUs, wherein sending the indication that the UE has changed to the second number of available CPUs is in response to receiving the DCI.

9. A method for wireless communications performed by a network entity, comprising:
transmitting, to a user equipment (UE), an indication of a maximum number of multiple-input multiple-output (MIMO) layers that the UE is expected to receive; and
receiving, from the UE, an indication that the UE has changed from a first number of available channel state information (CSI) reference signal (CSI-RS) processing units (CPUs) of the UE to a second number of available CPUs of the UE.

10. The method of claim 9, wherein the indication of the maximum number of MIMO layers comprises an assignment of an active bandwidth part (BWP) to the UE by the network entity.

11. The method of claim 9, wherein the indication from the UE further indicates that the UE is changing to the second number of available CPUs on a slot, subframe, or frame basis.

12. The method of claim 9, wherein receiving the indication that the UE has changed from the first number of available CPUs to the second number of available CPUs comprises receiving the indication in a CSI report from the UE.

13. The method of claim 9, wherein receiving the indication that the UE has changed from the first number of available CPUs to the second number of available CPUs comprises receiving the indication via a physical uplink control channel (PUCCH) from the UE.

14. The method of claim 9, wherein receiving the indication that the UE has changed to the second number of available CPUs comprises receiving the indication on a periodic basis.

15. The method of claim 9, further comprising transmitting a medium access control (MAC) control element (CE) requesting the UE to report a current number of available CPUs, wherein the indication that the UE has changed from the first number of available CPUs to the second number of available CPUs is responsive to the MAC CE.

16. The method of claim 9, further comprising transmitting a downlink control information (DCI) requesting the UE to report a current number of available CPUs, wherein the indication that the UE has changed from the first number of available CPUs to the second number of available CPUs is responsive to the DCI.

17. A user equipment (UE) configured for wireless communications, comprising:
a memory comprising computer-executable instructions; and
a processor configured to execute the computer-executable instructions and cause the UE to:
change, based on an indication of a maximum number of multiple-input multiple-output (MIMO) layers that the UE is expected to receive, from a first number of available channel state information (CSI) reference signal (CSI-RS) processing units (CPUs) of the UE to a second number of available CPUs of the UE; and
send, to a network entity, an indication that the UE has changed to the second number of available CPUs.

18. The UE of claim 17, wherein the indication of the maximum number of MIMO layers comprises an assignment of an active bandwidth part (BWP) to the UE.

19. The UE of claim 17, wherein the processor being configured to cause the UE to change to the second number of available CPUs comprises the processor being configured to cause the UE to change on a slot, subframe, or frame basis.

20. The UE of claim 17, wherein the processor being configured to cause the UE to send the indication that the UE has changed to the second number of available CPUs comprises the processor being configured to cause the UE to send the indication in a CSI report to the network entity.

21. The UE of claim 17, wherein the processor being configured to cause the UE to send the indication that the UE has changed to the second number of available CPUs comprises the processor being configured to cause the UE to send the indication via a physical uplink control channel (PUCCH).

22. The UE of claim 17, wherein the processor being configured to cause the UE to send the indication that the UE has changed to the second number of available CPUs comprises the processor being configured to cause the UE to send the indication on a periodic basis.

23. The UE of claim 17, wherein the processor is configured to execute the computer-executable instructions and further cause the UE to:
receive a medium access control (MAC) control element (CE) requesting the UE to report a current number of available CPUs, wherein the processor being configured to cause the UE to send the indication that the UE has changed to the second number of available CPUs comprises the processor being configured to cause the UE to send the indication in response to receiving the MAC CE.

24. The UE of claim 17, wherein the processor is configured to execute the computer-executable instructions and further cause the UE to:
receive a downlink control information (DCI) requesting the UE to report a current number of available CPUs, wherein the processor being configured to cause the UE to send the indication that the UE has changed to the second number of available CPUs comprises the processor being configured to cause the UE to send the indication in response to receiving the DCI.

25. A network entity configured for wireless communications, comprising:
a memory comprising computer-executable instructions; and
a processor configured to execute the computer-executable instructions and cause the network entity to:
transmit, to a user equipment (UE), an indication of a maximum number of multiple-input multiple-output (MIMO) layers that the UE is expected to receive; and
receive, from the UE, an indication that the UE has changed from a first number of available channel state information (CSI) reference signal (CSI-RS) processing units (CPUs) of the UE to a second number of available CPUs of the UE.

26. The network entity of claim 25, wherein the indication of the maximum number of MIMO layers comprises an assignment of an active bandwidth part (BWP) to the UE by the network entity.

27. The network entity of claim 25, wherein the processor being configured to cause the network entity to receive the indication from the UE comprises the processor being configured to cause the network entity to receive a further indication that the UE is changing to the second number of available CPUs on a slot, subframe, or frame basis.

28. The network entity of claim 25, wherein the processor being configured to cause the network entity to receive the indication that the UE has changed from the first number of available CPUs to the second number of available CPUs comprises the processor being configured to cause the network entity to receive the indication via at least one of:
a CSI report from the UE; or
a physical uplink control channel (PUCCH) from the UE.

29. The network entity of claim 25, wherein the processor being configured to cause the network entity to receive the indication that the UE has changed to the second number of available CPUs comprises the processor being configured to cause the network entity to receive the indication on a periodic basis.

30. The network entity of claim 25, wherein the processor is configured to execute the computer-executable instructions and further cause the network entity to:
transmit a medium access control (MAC) control element (CE) or a downlink control information (DCI) requesting the UE to report a current number of available CPUs, wherein the processor being configured to cause the network entity to receive the indication that the UE has changed from the first number of available CPUs to the second number of available CPUs comprises the processor being configured to receive the indication that is responsive to the MAC CE or the DCI.

* * * * *